US008610857B2

(12) United States Patent
Kimura et al.

(10) Patent No.: US 8,610,857 B2
(45) Date of Patent: *Dec. 17, 2013

(54) LIQUID CRYSTAL DISPLAY HAVING TRANSPARENT CONDUCTIVE FILM ON INTERLAYER INSULATING FILM FORMED BY COATING

(75) Inventors: Shigeru Kimura, Tokyo (JP); Akitoshi Maeda, Tokyo (JP); Satoshi Doi, Kagoshima (JP); Takayuki Ishino, Kagoshima (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/458,322

(22) Filed: Jul. 8, 2009

(65) Prior Publication Data
US 2009/0273752 A1 Nov. 5, 2009

Related U.S. Application Data

(62) Division of application No. 11/364,613, filed on Feb. 27, 2006, now Pat. No. 7,586,572, which is a division of application No. 10/107,578, filed on Mar. 28, 2002, now abandoned.

(30) Foreign Application Priority Data

Mar. 29, 2001 (JP) ................................. 2001-096263

(51) Int. Cl.
*G02F 1/1343* (2006.01)

(52) U.S. Cl.
USPC ............................................ 349/139; 349/43

(58) Field of Classification Search
USPC ...................... 349/42–43, 138–139
See application file for complete search history.

(56) References Cited

U.S. PATENT DOCUMENTS 5,317,193 A 5/1994 Watanabe
5,557,121 A 9/1996 Kozuka et al.
(Continued)

FOREIGN PATENT DOCUMENTS

CN 1328268 A 12/2001
JP 2520399 2/1988
(Continued)

OTHER PUBLICATIONS

Y. Kataoka et al., "ITO Etching Shift Characteristics on Organic Insulating Film," Proceedings of 20th IDRA 2000 Florida Palm Beach, pp. 123-126, Sep. 25-28, 2000.

*Primary Examiner* — Dung Nguyen
(74) *Attorney, Agent, or Firm* — Foley & Lardner LLP

(57) ABSTRACT

A liquid crystal display is fabricated which has bus wires disposed in a grid shape, switching elements coupled to the bus wires, and pixel electrodes which are disposed on an interlayer insulating film formed by coating and which are coupled with the switching elements. In fabricating the liquid crystal display, when a transparent conductive film is formed on the interlayer insulating film which is formed by coating, the temperature of the substrate is controlled to become 100° C.-170° C. In another embodiment, when the transparent conductive film is formed on the interlayer insulating film in a non-heated condition, an oxygen flow rate ratio is set to 1% or lower, and annealing is performed after forming the film. Thereby, when etching the ITO film on the interlayer insulating film, etching residue is not produced. Further, contact resistance between the ITO film and the lower layer metal can be uniformly decreased, and display defects can be obviated.

3 Claims, 18 Drawing Sheets

(56) References Cited

U.S. PATENT DOCUMENTS

| | | |
|---|---|---|
| 5,953,084 A | 9/1999 | Shimada et al. |
| 5,995,174 A | 11/1999 | Ukita |
| 5,995,187 A | 11/1999 | Wakagi et al. |
| 6,038,003 A | 3/2000 | Kim |
| 6,052,162 A | 4/2000 | Shimada et al. |
| 6,097,452 A | 8/2000 | Shimada et al. |
| 6,188,176 B1 | 2/2001 | Nakaya et al. |
| 6,195,138 B1 | 2/2001 | Shimada et al. |
| 6,218,206 B1 | 4/2001 | Inoue et al. |
| 6,226,060 B1 | 5/2001 | Onisawa et al. |
| 6,624,082 B2 | 6/2001 | Fukuyoshi et al. |
| 6,310,674 B1 | 10/2001 | Suzuki et al. |
| 6,313,889 B1 * | 11/2001 | Song et al. ............ 349/54 |
| 6,316,343 B1 | 11/2001 | Wada et al. |
| 6,373,546 B1 * | 4/2002 | Kim ............... 349/152 |
| 6,429,916 B1 | 8/2002 | Nakata et al. |
| 6,448,158 B2 | 9/2002 | Peng et al. |
| 6,465,117 B2 | 10/2002 | Takaki et al. |
| 6,480,253 B1 | 11/2002 | Shigeta et al. |
| 6,528,397 B1 | 3/2003 | Taketomi et al. |
| 6,567,145 B1 | 5/2003 | Kaneko et al. |
| 6,568,978 B2 | 5/2003 | Kataoka et al. |
| 6,624,864 B1 | 9/2003 | Kubo et al. |
| 6,649,936 B1 | 11/2003 | Sung et al. |
| 6,700,636 B2 * | 3/2004 | Kim et al. ............ 349/139 |
| 6,768,533 B2 | 7/2004 | Hanakawa et al. |
| 6,852,998 B2 | 2/2005 | Sung et al. |
| 7,586,572 B2 * | 9/2009 | Kimura et al. ......... 349/139 |
| 2001/0002857 A1 | 6/2001 | Shimada et al. |
| 2001/0028217 A1 | 10/2001 | Kataoka et al. |
| 2003/0016308 A1 | 1/2003 | Jeon |

FOREIGN PATENT DOCUMENTS

| | | |
|---|---|---|
| JP | 03064450 | 3/1991 |
| JP | 5-242745 A | 9/1993 |
| JP | 6-289417 A | 10/1994 |
| JP | 7-199210 A | 8/1995 |
| JP | 7-221312 | 8/1995 |
| JP | 8-64034 A | 3/1996 |
| JP | 08185797 | 7/1996 |
| JP | 9-152625 | 6/1997 |
| JP | 10-10576 A | 1/1998 |
| JP | 10-48670 A | 2/1998 |
| JP | 10-133216 A | 5/1998 |
| JP | 10-133218 A | 5/1998 |
| JP | 10-170933 A | 6/1998 |
| JP | 10-186412 A | 7/1998 |
| JP | 11-133380 | 5/1999 |
| JP | 11-283934 A | 10/1999 |
| JP | 2000-104166 | 4/2000 |
| JP | 2000-222944 A | 8/2000 |
| JP | 2000-231123 A | 8/2000 |
| JP | 2000-255016 A | 9/2000 |
| JP | 2000-259096 A | 9/2000 |
| JP | 2000-267134 A | 9/2000 |
| JP | 2000-282225 | 10/2000 |
| JP | 2000-282225 A | 10/2000 |
| JP | 2000-286410 | 10/2000 |
| JP | 2000-298291 A | 10/2000 |
| JP | 2000-330134 A | 11/2000 |
| JP | 2001-345023 | 12/2001 |
| KR | 1999-0037504 | 5/1999 |
| KR | 1999-0067926 | 8/1999 |
| KR | 10-0241607 | 2/2000 |
| KR | 2000-0071541 | 11/2000 |
| KR | 1999-0083238 | 9/2003 |

* cited by examiner

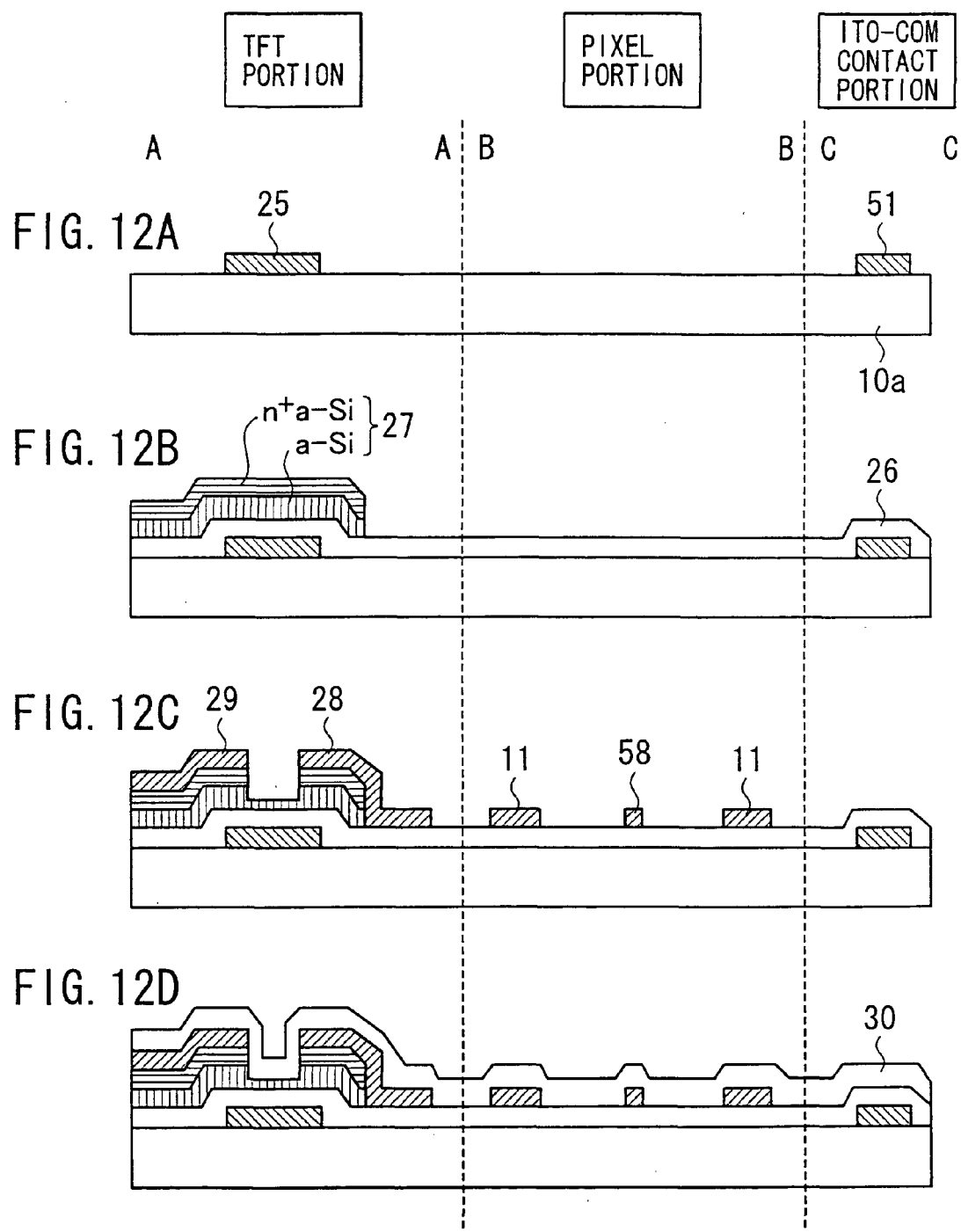

FIG. 18
| SUBSTRATE TEMPERATURE | 100°C | 150°C | 170°C | 200°C |
|---|---|---|---|---|
| ITO ETCHING DEPTH | ○ | ○ | ○ | × |
FIG. 19
| ANNEAL TEMPERATURE | 150°C | 200°C | 230°C | 240°C | 250°C |
|---|---|---|---|---|---|
| ITO LINE WIDTH UNIFORMITY | × | ○ | ○ | ○ | ○ |
| COLORING OF ORGANIC INSULATING FILM | ○ | ○ | ○ | △ | × |
FIG. 20
| DIFFERENCE OF CONTACT RESISTANCE | 0Ω | 1KΩ | 1.5Ω | 3KΩ |
|---|---|---|---|---|
| VERTICAL STRIPED UNEVENNESS | ○ | ○ | △ | × |
FIG. 21A
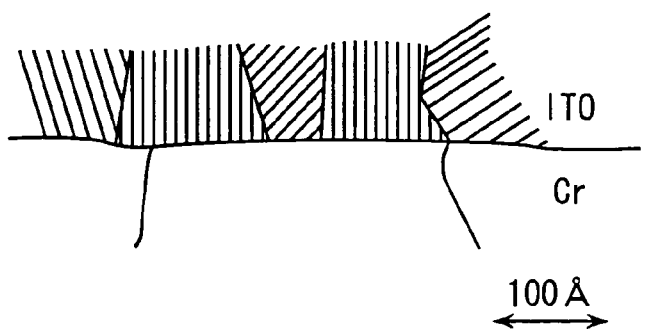
FIG. 21B

LIQUID CRYSTAL DISPLAY HAVING TRANSPARENT CONDUCTIVE FILM ON INTERLAYER INSULATING FILM FORMED BY COATING

CROSS-REFERENCE TO RELATED PATENT APPLICATIONS

This application is a division of application Ser. No. 11/364,613, filed Feb. 27, 2006, now pending, which is a division of application Ser. No. 10/107,578, filed Mar. 28, 2002, abandoned, and based on Japanese Patent Application No. 2001-096263, filed Mar. 29, 2001, by Shieru KIMURA, Akitoshi MAEDA, Satoshi DOI, and Takayuki ISHINO, which are incorporated herein by reference in their entirety. This application claims only subject matter disclosed in the parent application and therefore presents no new matter.

FIELD OF THE INVENTION

The present invention relates generally to a liquid crystal display and a method of manufacturing the same. More particularly, the present invention relates to a liquid crystal display having a high resolution display panel in which an insulating film formed by coating such as an organic film and the like is used as an interlayer insulating film.

BACKGROUND OF THE INVENTION

Conventionally, a transmission type liquid crystal display is widely used in which a thin film transistor (TFT) or a metal insulator metal (MIM) device is used as a switching element for driving and controlling each pixel electrode.

FIG. 22A is a partial enlarged plan view showing a pixel portion of an active matrix substrate in a conventional transmission type liquid crystal display which uses TFT's and which is disclosed in Japanese patent laid-open publication No. 9-152625. FIG. 22B is a cross sectional view taken along the line B-B of FIG. 22A. In the active matrix substrate of this transmission type liquid crystal display, a plurality of pixel electrodes are formed in a matrix.

As shown in FIG. 22A, around a pixel electrode 1, there are disposed scanning lines 2a and signal lines 2b. The scanning lines 2a are disposed parallel to each other and are used for supplying scanning signals to the pixel electrodes 1. The signal lines 2b are disposed parallel to each other and perpendicular to the scanning lines 2a. The signal lines 2b are used for supplying display signals to the pixel electrodes 1. The scanning lines 2a and the signal lines 2b are disposed such that a portion of each scanning line 2a and a portion of each signal line 2b overlap the peripheral portion of the pixel electrode 1. In the proximity of each of intersections between the scanning lines 2a and the signal lines 2b, there is disposed a thin film transistor (TFT) 3 which is coupled with the pixel electrode 1.

The gate electrode of the TFT 3 is coupled with the scanning line 2a, and the source electrode of the TFT 3 is coupled with the signal line 2b. The drain electrode of the TFT 3 is coupled with the pixel electrode 1 via a connecting electrode 4a and further via a contact hole 5, and is also coupled with an additional capacitance electrode 4b via the connecting electrode 4a.

As shown in FIG. 22B, on a transparent insulating substrate 6, a gate electrode 3a, a gate insulating film 7a, and a semiconductor layer 8a are stacked in this order. On the central portion of the semiconductor layer 8a, a channel protection layer 8b is provided. Further, there is provided an amorphous silicon ($n^+$ a-Si) layer which covers the semiconductor layer 8a and which is segmented on the channel protection layer 8b into a source electrode 3b and a drain electrode 3c.

On an end portion of the source electrode 3b, there is disposed the signal line 2b having a two layer structure comprising a transparent conductive film and a metal layer. Also, on an end portion of the drain electrode 3c, there are disposed a transparent conductive film and a metal layer, and the transparent conductive film is extended as the connecting electrode 4a to couple the drain electrode 3c and the pixel electrode 1 together. The connecting electrode 4a is also connected to the additional capacitance electrode 4b. Further, an interlayer insulating film (passivation film) 9 is provided to cover the TFT 3, the scanning line 2a, the signal line 2b, and the connecting electrode 4a.

An explanation will now be made on a manufacturing process of the active matrix substrate having the above-mentioned structure. First, on a transparent insulating substrate 6 made, for example, of glass and the like, a gate electrode 3a is formed. On an area including the gate electrode 3a and the like, a gate insulating film 7a and an amorphous silicon (a-Si) layer are formed one after another in this order. The amorphous silicon (a-Si) layer is patterned to form a semiconductor layer 8a. Next, on the semiconductor layer 8a and over the gate electrode 3a, a channel protection film 8b is formed. An amorphous silicon ($n^+$ a-Si) layer is then formed to cover the channel protection layer 8b and the semiconductor layer 8a, and is patterned to form the source electrode 3b and the drain electrode 3c.

On the source electrode 3b and the drain electrode 3c, an interlayer insulating film 9 comprising an organic film is formed, and a contact hole 5 is opened in the interlayer insulating film 9. Thereafter, an indium-tin-oxide (ITO) film is formed to cover the interlayer insulating film 9 by sputtering, and is patterned to form a plurality of transparent pixel electrodes 1 made of ITO.

In the above-mentioned process, it is preferable that, after forming the contact hole 5, the surface of the interlayer insulating film 9 comprising an organic film is ashed by using oxygen plasma. Thereby, it is possible to improve adhesion between the ITO film and the organic film and to avoid defective coupling between the ITO film and the metal film of the additional capacitance electrode.

The reason why the organic film having a lower relative permittivity value than that of an inorganic film is used as the interlayer insulating film 9 in place of the inorganic film hitherto used is to reduce cross talk between the signal lines and the pixel electrodes. That is, by using the organic film as the interlayer insulating film 9, it is possible to reduce capacitive coupling between the signal lines and the pixel electrodes when the pixel electrodes and the signal lines are partially overlapped to improve aperture ratio, and thereby it becomes possible to reduce the cross talk.

Conventionally, when the ITO film is formed on the interlayer insulating film 9 comprising the organic film, a high temperature sputtering method is used in which the transparent insulating substrate 6 is heated to improve patterning characteristics of the ITO film.

An example of a method of forming an ITO film which uses the high temperature sputtering is disclosed in Japanese patent No. 2520399. In this patent, it is described that a condition for forming an ITO film having good quality without causing deterioration of color filters is to set the temperature of a substrate between 180° C. and 250° C. In Japanese patent laid-open publication No. 9-152625 mentioned before, a condition of forming the ITO film is not described at all.

However, when the ITO film is formed by using the high temperature sputtering, the ITO film deteriorates due to outgassing from the organic insulating film, and patterning can not be done well, due to the generation of etching residue. This is especially prominent when wet etching is used.

In order to obviate such defects, it is conceivable to form the ITO film on the organic insulating film by using a low temperature sputtering or sputtering in a non-heated condition. However, when the low temperature sputtering is used, contact resistance between the ITO film and the metal film of the lower layer becomes large.

When the contact resistance becomes large, it becomes impossible to realize sufficient uniformity of the contact resistance in the substrate area. Insufficient uniformity of the contact resistance causes vertical striped unevenness of an image displayed on a display panel surface. The insufficient uniformity of the contact resistance has a large influence on the displayed image especially in a high resolution liquid crystal display panel in which, because of a narrow space between respective signal lines, signal terminals coupled with the signal lines are disposed on opposite sides alternately or disposed on opposite sides every plurality of signal terminals.

Also, when the contact resistance increases, a lateral cross talk phenomenon occurs in a twisted nematic (TN) type liquid crystal display panel having a common storage structure, or in an in-plane switching (IPS) type liquid crystal display panel.

That is, in the TN type liquid crystal display panel having the common storage structure, a common voltage potential is applied to common wiring conductors for constituting storage capacitors. Therefore, it is necessary to mutually couple the common wiring conductors. When a TFT substrate structure is used in which the common wiring conductors are mutually coupled by using an ITO film on an interlayer insulating film (passivation film), the contact resistance becomes high because the interlayer insulating film is made of an organic insulating film. Therefore, it is inevitable that the overall resistance of the common wiring conductors becomes high.

SUMMARY OF THE INVENTION

Therefore, it is an object of the present invention to provide a liquid crystal display and a method of manufacturing the same in which, when an ITO film is formed on an interlayer insulating film formed by coating, such as an organic insulating film, etching residue is not produced and the ITO film can be formed and patterned appropriately.

It is another object of the present invention to provide a liquid crystal display and a method of manufacturing the same in which an ITO film is formed on an interlayer insulating film formed by coating, such as an organic insulating film and in which contact resistance between an ITO film and a lower metal film can be reduced.

It is still another object of the present invention to provide a liquid crystal display and a method of manufacturing the same in which contact resistance between an ITO film and a lower metal film can be reduced, thereby obviating display defects of an image displayed in a liquid crystal display panel.

It is still another object of the present invention to provide a liquid crystal display and a method of manufacturing the same in which contact resistance between an ITO film and a lower metal film can be reduced, thereby obviating vertical striped unevenness of an image displayed in a liquid crystal display panel.

It is still another object of the present invention to provide a liquid crystal display and a method of manufacturing the same in which contact resistance between an ITO film and a lower metal film can be reduced, thereby obviating lateral cross talk phenomenon in a liquid crystal display panel.

It is still another object of the present invention to obviate the disadvantages of the conventional liquid crystal display and method of manufacturing the same.

According to an aspect of the present invention, there is provided a method of manufacturing a liquid crystal display which has bus wires disposed on a substrate in a grid shape, switching elements coupled to the bus wires, and pixel electrodes formed of a transparent conductive film disposed on an interlayer insulating film formed by coating, the pixel electrodes being coupled with the switching elements via contact through holes formed through the interlayer insulating film, said method comprising: controlling the temperature of the substrate to 100-170° C., when the transparent conductive film is formed on the interlayer insulating film.

In this case, it is preferable that the substrate is previously heated in a heating chamber and then transferred to a chamber for forming the transparent conductive film.

It is also preferable that the substrate is previously heated and sputter etched in a heating chamber and then transferred to a chamber for forming the transparent conductive film.

It is further preferable that heating of the substrate, sputter etching after the heating, and forming the transparent conductive film thereafter are performed in the same vacuum condition.

It is advantageous that the interlayer insulating film formed by coating is an organic insulating film.

It is also advantageous that the liquid crystal display has a metal film coupled with the transparent conductive film, the transparent conductive film is made of ITO, and the metal film coupled with the transparent conductive film is made of chromium or an alloy containing chromium as the main constituent.

According to another aspect of the present invention, there is provided a method of manufacturing a liquid crystal display which has bus wires disposed on a substrate in a grid shape, switching elements coupled to the bus wires, and pixel electrodes formed of a transparent conductive film disposed on an interlayer insulating film formed by coating, the pixel electrodes being coupled with the switching elements via contact through holes formed through the interlayer insulating film, said method comprising: forming the transparent conductive film on the interlayer insulating film in a non-heated condition and in a condition in which an oxygen flow rate ratio is 1% or smaller; and annealing after forming the transparent conductive film.

In this case, it is preferable that the annealing is performed at a temperature of 200-240° C.

It is also preferable that the interlayer insulating film formed by coating is an organic insulating film.

It is further preferable that the liquid crystal display has a metal film coupled with the transparent conductive film, the transparent conductive film is made of ITO, and the metal film coupled with the transparent conductive film is made of chromium or an alloy containing chromium as the main constituent.

According to still another aspect of the present invention, there is provided a method of manufacturing a liquid crystal display which has bus wires disposed on a substrate in a grid shape, switching elements coupled to the bus wires, and pixel electrodes formed of a transparent conductive film disposed on an interlayer insulating film formed by coating, the pixel electrodes being coupled with the switching elements via contact through holes formed through a passivation film and the interlayer insulating film, said method comprising: when forming the contact through holes formed through the passivation film and the interlayer insulating film, forming openings of the passivation film by plasma etching.

In this case, it is preferable that the interlayer insulating film formed by coating is an organic insulating film.

It is also preferable that the liquid crystal display has a metal film coupled with the transparent conductive film, the transparent conductive film is made of ITO, and the metal film coupled with the transparent conductive film is made of chromium or an alloy containing chromium as the main constituent.

According to still another aspect of the present invention, there is provided a liquid crystal display comprising: a transparent substrate; a plurality of parallel scanning lines disposed on the transparent substrate; a plurality of parallel signal lines which cross the plurality of parallel scanning lines; switching elements coupled to the scanning lines and the signal lines; and pixel electrodes formed from a transparent conductive film disposed on an interlayer insulating film formed by coating, the pixel electrodes being coupled with the switching elements via contact through holes formed through the interlayer insulating film; wherein the transparent conductive film formed on the interlayer insulating film has portions contacting a lower layer metal film and the interlayer insulating film has crystallinity at the portions contacting the lower layer metal film.

In this case, it is preferable that the interlayer insulating film formed by coating is an organic insulating film.

It is also preferable that the transparent conductive film is made of ITO, and the lower layer metal film contacting the transparent conductive film is made of chromium or an alloy containing chromium as the main constituent.

According to still another aspect of the present invention, there is provided a liquid crystal display comprising: a transparent substrate; a plurality of parallel scanning lines disposed on the transparent substrate; a plurality of parallel signal lines which cross the plurality of parallel scanning lines; switching elements coupled to the scanning lines and the signal lines; pixel electrodes formed from a transparent conductive film disposed on an interlayer insulating film formed by coating, the pixel electrodes being coupled with the switching elements via contact through holes formed through the interlayer insulating film; and signal line terminals each of which is coupled to one end of the respective signal lines and comprises a stacked portion of the transparent conductive film and a lower layer metal film and which are disposed on opposite sides of the substrate alternately or every plurality of terminals; wherein contact resistance between the transparent conductive film and the lower layer metal film differs between the signal line terminals on opposite sides of the substrate by a value of 1500Ω or smaller.

In this case, it is preferable that the interlayer insulating film formed by coating is an organic insulating film.

It is also preferable that the transparent conductive film is made of ITO, and the lower layer metal film coupled with the transparent conductive film is made of chromium or an alloy containing chromium as the main constituent.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which:

FIGS. 12A-12D are cross sectional views each illustrating structures of workpieces during a manufacturing process of a TFT substrate of FIG. 10;

FIG. 18 is an illustration showing by a table a relationship between the substrate temperature when the ITO film is sputtered and the condition of etching residue;

FIG. 19 is an illustration showing by a table a relationship between annealing temperature and ITO line width uniformity within the substrate and between annealing temperature and coloring of the organic insulating film, after the sputtering of the ITO film in the non-heated condition;

FIG. 20 is an illustration showing by a table a relationship between a difference in contact resistance values of upside and downside signal terminals and a condition of occurrence of vertical striped unevenness, in the first embodiment;

FIG. 21A and FIG. 21B are schematic illustrations showing examples of observation result by the TEM of the coupling portion between the transparent conductive film and the lower layer metal film in the liquid crystal display fabricated by the manufacturing method according to the present invention.

DESCRIPTION OF A PREFERRED EMBODIMENT

With reference to the drawings, embodiments of the present invention will be described in detail.

First Embodiment

Figure 1:
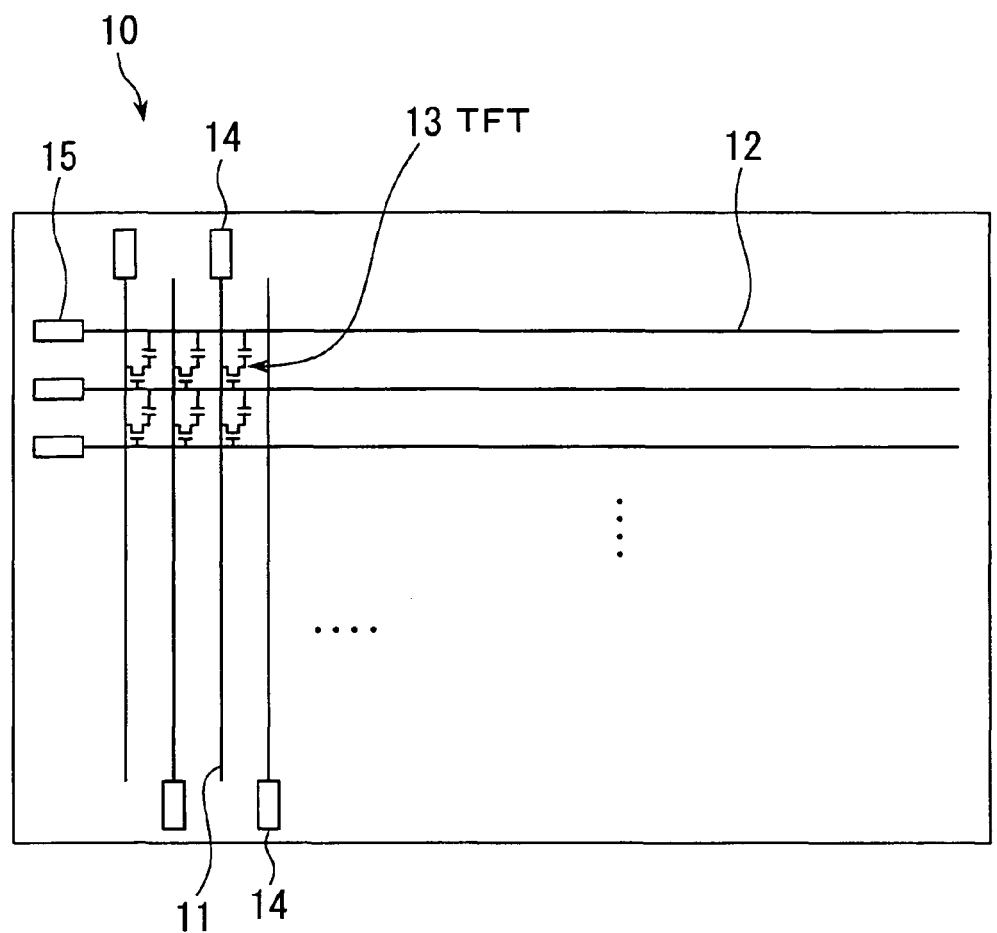
FIG. 1 is a schematic plan view illustrating a structure of a TFT substrate in a transmission type liquid crystal display according to the first embodiment of the present invention.

FIG. 1 is a schematic plan view illustrating a structure of a TFT substrate in a transmission type liquid crystal display according to the first embodiment of the present invention. The TFT substrate 10 shown in FIG. 1 is opposed to an opposing substrate 17 mentioned later, and the gap between the TFT substrate 10 and the opposing substrate 17 is filled with liquid crystal material to form a liquid crystal display panel of a liquid crystal display (see FIG. 2 and FIG. 4).

On the surface of the TFT substrate 10 on the side of the opposing substrate 17, there are disposed a plurality of signal lines 11 and a plurality of scanning lines 12 which intersect the signal lines 11, in a grid shaped arrangement. In the proximity of each intersection between one of the signal lines 11 and one of the scanning lines 12, a TFT 13 is formed. Therefore, the TFT's 13 are disposed in a matrix.

In this embodiment, the TFT 13 constitutes a high resolution liquid crystal display panel having a CF on TFT (color filter on thin film transistor) structure in which color filters are disposed on or over the TFT's 13.

In a high resolution liquid crystal display panel, since the space between adjacent signal lines 11 which are disposed along vertical direction of the panel becomes narrow, signal terminals 14 each of which is provided at one end of the signal line 11 are located on the opposite sides of the TFT substrate 10 such that the signal terminals 14 are disposed on opposite sides alternately or disposed on opposite sides every plurality of signal lines 11. With respect to the scanning lines 12 which are disposed along lateral direction of the panel, scanning line terminals 15 each of which is provided at one end of the scanning line 12 are disposed on one side of the TFT substrate 10.

Each of the signal lines 11 is coupled with the source electrodes of the TFT's 13 disposed in a corresponding column of the TFT matrix, and used for inputting a data signal to the source electrodes. Each of the scanning lines 12 is coupled with the gate electrodes of the TFT's 13 disposed in a corresponding row of the TFT 13 matrix. A scanning signal is supplied from each of the scanning lines 12 to the corresponding gates of the TFT's 13. Thereby, each TFT 13 is driven and the data signal is written into a pixel electrode coupled with the drain electrode of the TFT 13.

Figure 2:
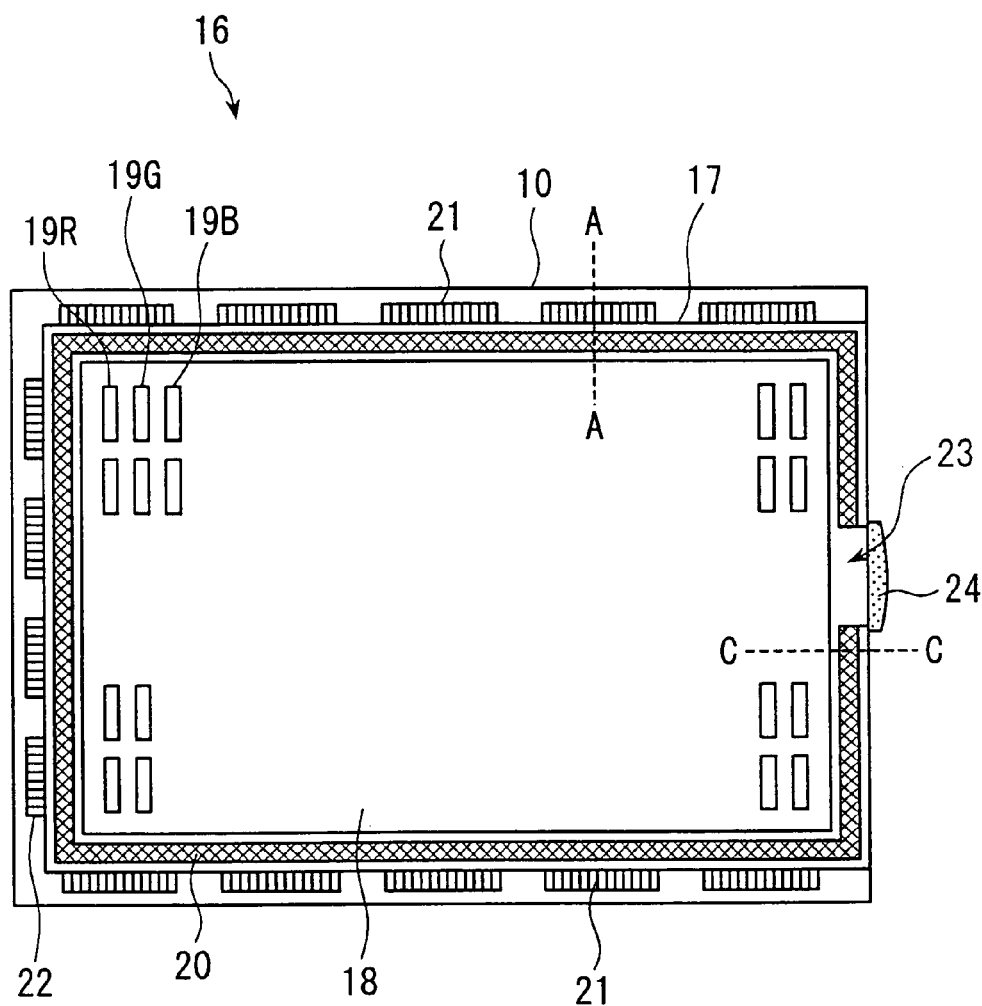
FIG. 2 is a plan view showing a liquid crystal display panel which uses the TFT substrate 10 of FIG. 1.
Figure 3:
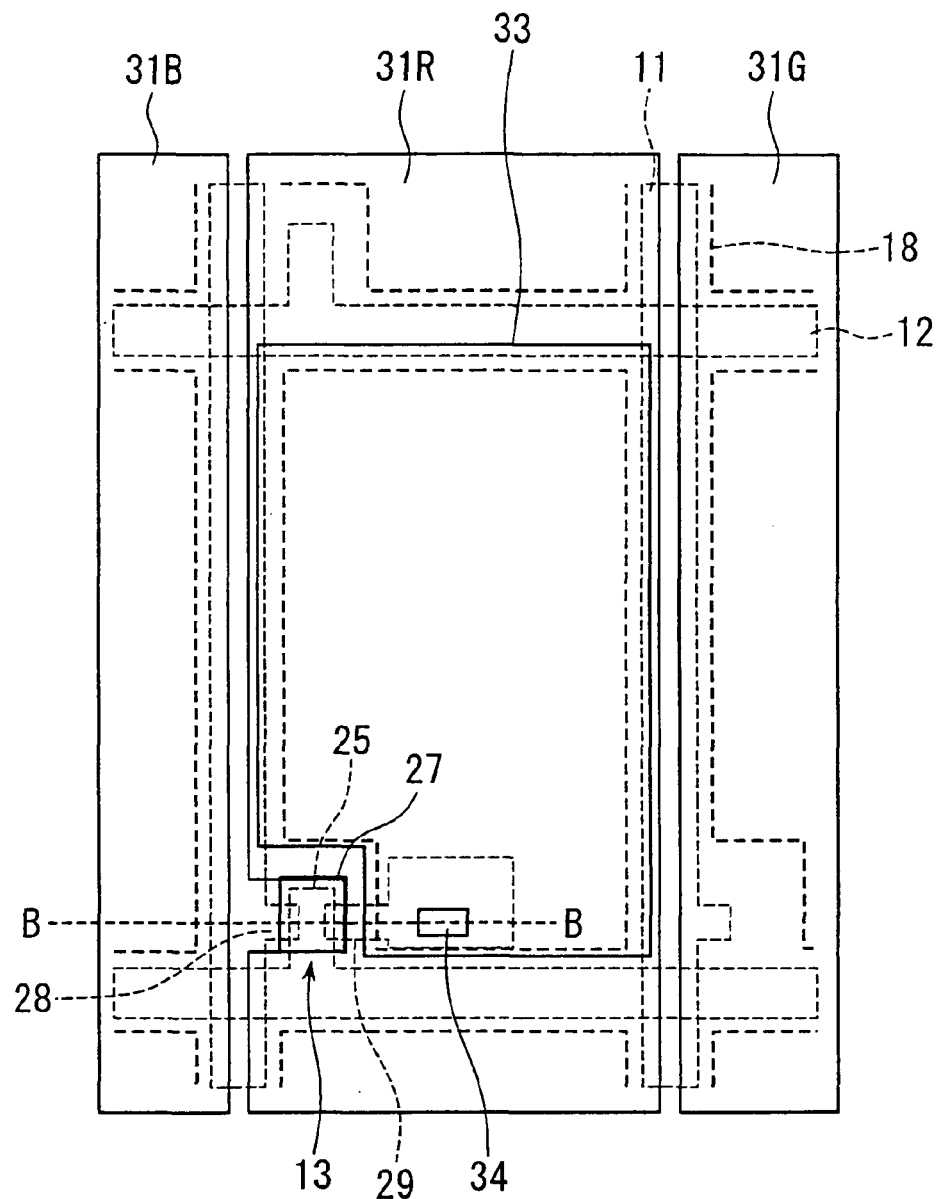
FIG. 3 is an enlarged plan view showing a portion of one pixel of the TFT substrate of FIG. 1.
Figure 4:
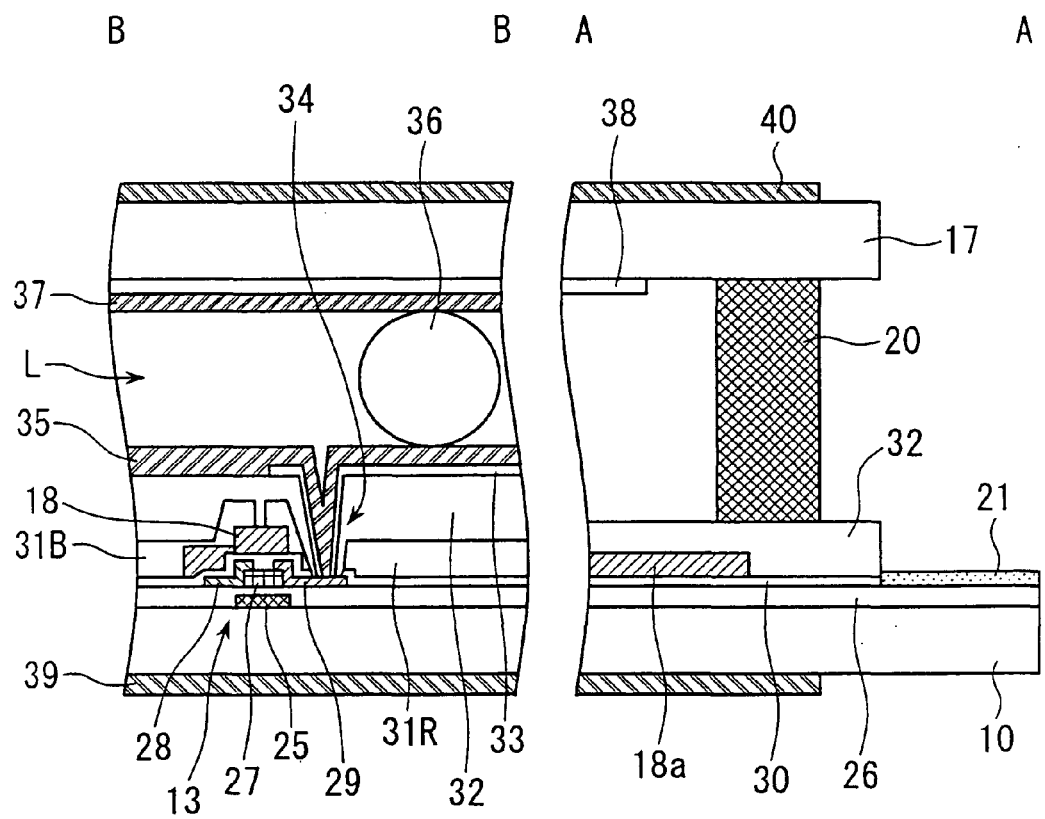
FIG. 4 includes a cross sectional view taken along the line A-A of FIG. 2, and a cross sectional view taken along the line B-B of FIG. 3.

FIG. 2 is a plan view showing a liquid crystal display panel which uses the TFT substrate 10 of FIG. 1. FIG. 3 is an enlarged plan view showing a portion of one pixel of the TFT substrate of FIG. 1. FIG. 4 includes a cross sectional view taken along the line A-A of FIG. 2, and a cross sectional view taken along the line B-B of FIG. 3.

As shown in FIG. 2 and FIG. 4, a liquid crystal display panel 16 has the TFT substrate 10 and an opposing substrate 17 each of which comprises a transparent insulating substrate made of glass and the like and each of which has a rectangular shape. In the gap between the TFT substrate 10 and the opposing substrate 17, liquid crystal material L (see FIG. 4) is inserted to form the liquid crystal display panel 16.

On the upper surface of the TFT substrate 10, there is formed a black matrix 18. The black matrix 18 has a plurality of openings 19 (see FIG. 2) which correspond to pixel electrodes 33 (see FIG. 4). The openings 19 comprise, for example, openings 19R for red color filters, openings 19G for green color filters and openings 19B for blue color filters, which are repetitively disposed in order.

The TFT substrate 10 and the opposing substrate 17 are opposed to each other via a predetermined gap between them, and are fixed to each other by a sealing material 20 which is disposed along the peripheral portion of the substrates 10 and 17. On the outer peripheral portions of the TFT substrate 10 along three sides thereof, signal terminals are disposed. That is, a plurality of horizontal (H) side terminals 21, i.e., signal line terminals 14, are disposed along two of lateral edge portions of the panel and extend in a vertical direction, and a plurality of vertical (V) side terminals 22, i.e., scanning line terminals 15, are disposed along one of vertical edge portions of the panel and extend in lateral direction. The horizontal (H) side terminals 21 and the vertical (V) side terminals 22 are not covered by the opposing substrate 17.

At a portion of the sealing material 20 on the side opposite to the side along which the terminals 22 are disposed, there is disposed an infusion inlet 23 for infusing the liquid crystal material L into the gap between the TFT substrate 10 and the opposing substrate 17. The infusion inlet 23 is sealed with a sealing material or sealant 24, after infusing the liquid crystal material L into the gap between the TFT substrate 10 and the opposing substrate 17.

As shown in FIG. 3 and FIG. 4, on the TFT substrate 10, a gate electrode 25 is formed, and, further, a gate insulating film 26 is formed so as to cover the gate electrode 25. On the gate insulating film 26, a semiconductor layer 27 is formed such that the semiconductor layer 27 overlaps the gate electrode 25 via the gate insulating film 26. Also, a source electrode 28 and a drain electrode 29 are disposed which are separated via the space on the central portion of the semiconductor layer 27 and which are coupled with the semiconductor layer 27.

A passivation film 30 is formed to cover the semiconductor layer 27, the source electrode 28, the drain electrode 29 and the like. Thereby, a TFT 13 is formed.

On the passivation film 30, a black matrix 18 as a light shield film is formed at portions corresponding to the TFT 13 and the like. Also, a picture frame black matrix 18a is shown which is formed in the proximity of the H side terminals 21 and the V side terminals 22. Although not shown in detail in the drawing, the picture frame light shield film 18a is formed around the picture display area. Further, red color filters 31R, blue color filters 31B and green color filters (not shown in the drawing) are formed at portions corresponding to the pixel areas.

An overcoat film 32 is formed to cover these color filters 31 and the passivation film 30. A plurality of transparent pixel electrodes 33 are disposed on the overcoat film 32. The pixel electrodes 33 are made, for example, of an ITO film and are disposed in a matrix.

When the above-mentioned TFT 13 is used as a switching element, the drain electrode 29 functions as a lead electrode for coupling the pixel electrode 33 with the switching element. The drain electrode 29 and the pixel electrode 33 are coupled with each other via a contact through hole 34 which is formed so as to penetrate the overcoat film 32 and the passivation film 30.

The gate electrode 25 of the TFT 13 is coupled with the scanning line 12, the source electrode 28 of the TFT 13 is coupled with the signal line 11, and the drain electrode 29 is coupled with the pixel electrode 33 via the contact through hole 34. A switching signal is supplied to the gate electrode 25 of the TFT 13 via the scanning line 12, and an image signal is supplied to the source electrode 28 of the TFT 13 via the signal line 11, thereby electric charges are injected or written to the pixel electrode 33.

The black matrix 18 and the color filter 31 are formed without covering the portion of the contact through hole 34.

On the inner surface of the TFT substrate 10 having the pixel electrodes 33 formed thereon, there is formed an alignment film 35 which covers the pixel electrodes 33. Also, on the inner surface of the opposing substrate 17 which opposes the alignment film 35 formed on the surface of the TFT substrate 10, there is formed an alignment film 37. These TFT substrate 10 and the opposing substrate 17 are opposed via the liquid crystal material L, and, between the TFT substrate 10 and the opposing substrate 17, there are also disposed spacers 36 to keep the gap between both substrates 10 and 17 constant.

The alignment film 37 on the opposing substrate 17 is formed such that the alignment film 37 covers a transparent common electrode 38 formed on the opposing substrate 17. The transparent common electrode 38, each of the pixel electrodes 33 and the liquid crystal material L disposed therebetween (see FIG. 4) constitute pixel capacitance.

Further, on the outside surfaces of the TFT substrate 10 and the opposing substrate 17, that is, on the lower surface of the TFT substrate 10 and the upper surface of the opposing substrate 17, there are formed a TFT side polarizer film 39 and an opposing substrate side polarizer film 40, respectively.

Figure 5A:
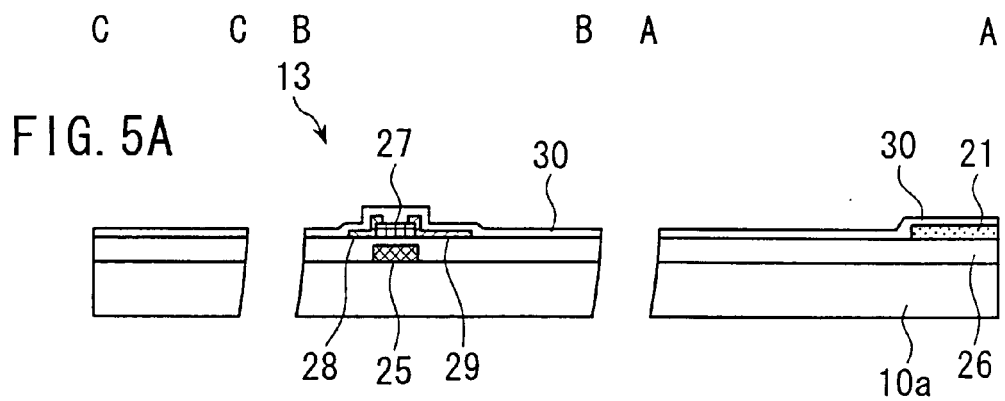
FIGS. 5A-5D are cross sectional views each illustrating structures of workpieces during a manufacturing process of a liquid crystal display panel which uses the TFT substrate of FIG. 1.
Figure 5B:
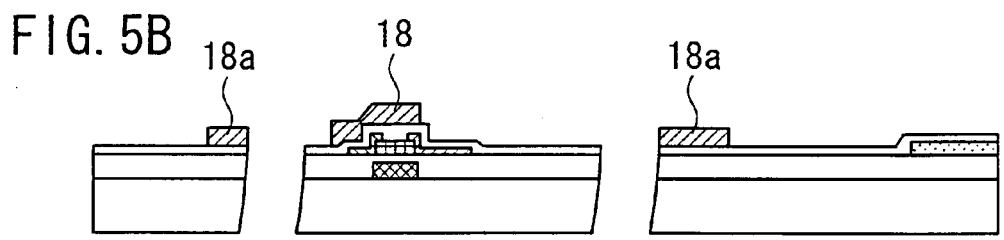
Figure 5C:
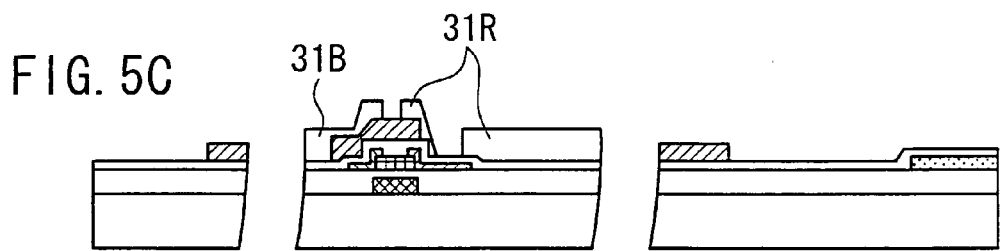
Figure 5D:
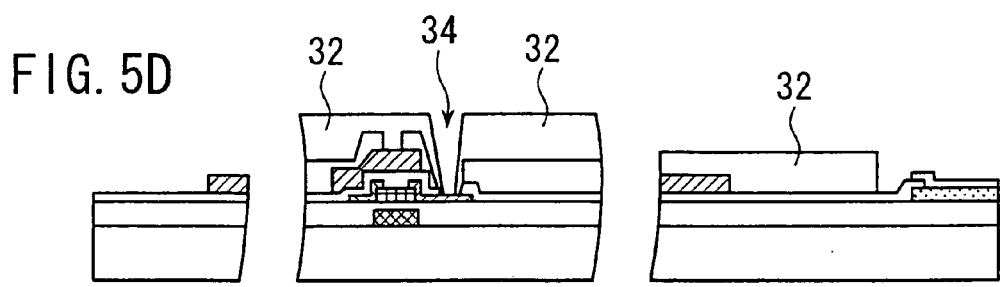
Figure 6E:
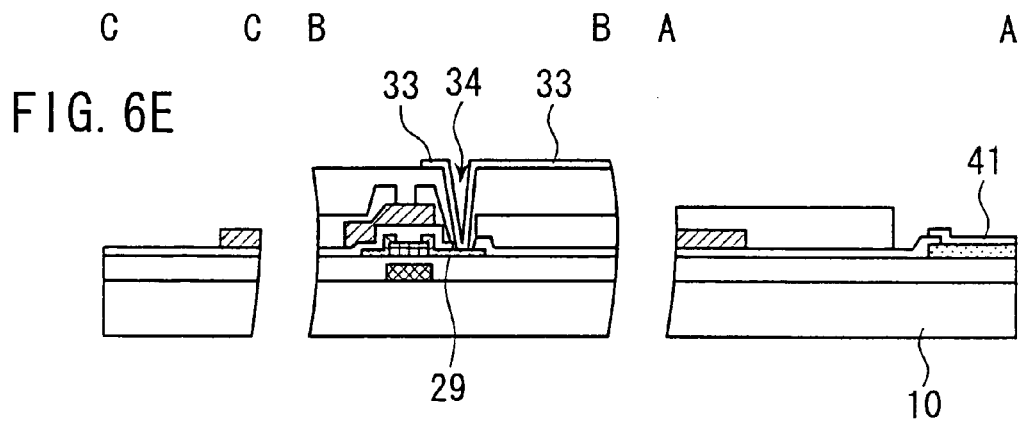
FIGS. 6E-6G are cross sectional views each illustrating structures of workpieces during a manufacturing process of a liquid crystal display panel which uses the TFT substrate of FIG. 1 obtained after the structures shown in FIGS. 5A-5D.
Figure 6F:
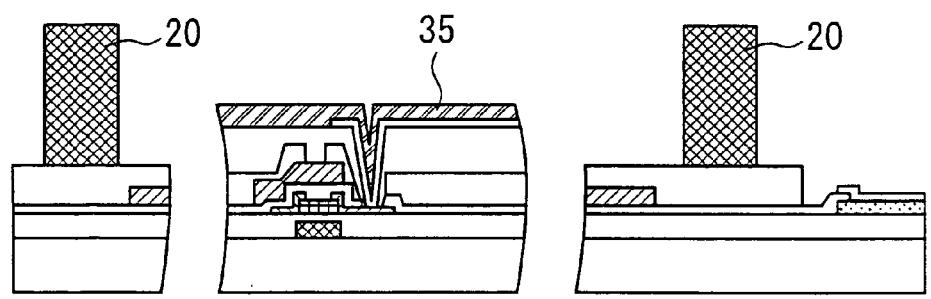
Figure 6G:
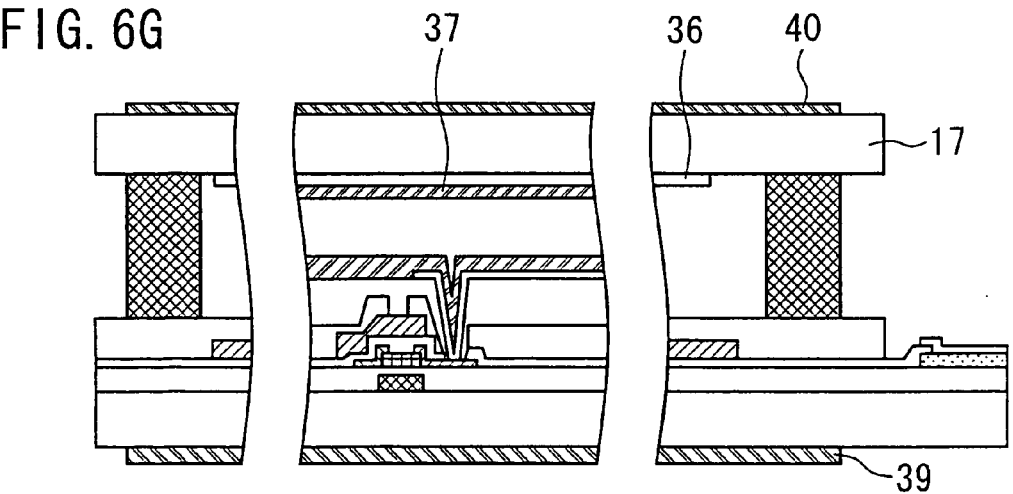

FIGS. 5A-5D and FIGS. 6E-6G are cross sectional views each illustrating structures of workpieces during a manufacturing process of a liquid crystal display panel which uses the TFT substrate of FIG. 1. Each of FIGS. 5A-5D and FIGS. 6E-6G includes a cross sectional view taken along the line A-A of FIG. 2, a cross sectional view taken along the line B-B of FIG. 3, and a cross sectional view taken along the line C-C of FIG. 2. FIGS. 6E-6G illustrate manufacturing steps performed after manufacturing steps illustrated by FIGS. 5A-5D.

As shown in FIGS. 5A-5D and FIGS. 6E-6C; first, a glass substrate 10a which has a thickness of approximately 0.7 mm and which is made of alkalifree glass is prepared. On the glass substrate 10a, a conductive film made of Cr. Mo, Cr/Al stacked film, Mo/Al stacked film and the like is formed to a film thickness of approximately 100-300 nm by sputtering. By using a photolithography method, the conductive film is patterned to form gate electrodes 25, scanning lines (not shown in the drawing) and V side terminals (not shown in the drawing) which are terminals of the scanning lines.

Thereafter, by using a plasma CVD (chemical vapor deposition) method, a gate insulating film 26 made of silicon nitride (SiNx) is formed to a film thickness of approximately 300-500 nm. Further, a layer of amorphous silicon (a-Si) is formed to a film thickness of approximately 150-300 nm, and then a layer of phosphorus doped amorphous silicon (n$^+$ a-Si) is formed to a film thickness of approximately 30-50 nm. By using a photolithography method, these layers are patterned to form a semiconductor layer 27.

A conductive film made of Cr, Mo, Cr/Al/Cr stacked film, Mo/Al/Mo stacked film and the like is formed to a film thickness of approximately 100-400 nm by sputtering. By using a photolithography method, the conductive film is patterned to form source electrodes 25, drain electrodes 29, signal lines (not shown in the drawing) and H side terminals which are terminals of the signal lines.

By using plasma CVD method, a passivation film 30 is formed which is made of an inorganic film such as a silicon nitride (SiNx) film and the like to a film thickness of approximately 100-200 nm (see FIG. 5A).

Next, a black matrix 18 and a picture-frame black matrix 18a are formed by using negative type acrylic photoresist in which pigment is dispersed, or by using photoresist of carbon system. The black matrix 18 and the picture-frame black matrix 18a are formed to have a film thickness of approximately 1-3 μm, an optical density (OD value) of 3 or larger, and a sheet resistance value of $1 \times 10^{10} \Omega/\square$ or larger (see FIG. 5B).

Further, by using negative type acrylic photoresist in which pigment is dispersed, red color filters 31R are formed which have a film thickness of approximately 1.0-1.5 μm. Similarly to the red color filters 31R, each color layer of blue color filters 31B and green color filters (not shown in the drawing) is formed (see FIG. 5C).

Then, by using positive type novolac photoresist, an overcoat film 32 which is an organic insulating film having a film thickness of approximately 2.0-3.5 μm is formed and patterned such that an opening is formed in each portion where a contact through hole is to be formed.

Thereafter, plasma etching is performed by using a photolithography process, and the passivation film 30 is dry etched to form a contact through hole 34. In this case, simultaneously with the formation of the contact through hole 34, the passivation film 30 on the H side terminals 21, and the passivation film 30 and the gate insulating film (not shown in the drawing) on the V side terminals are also removed.

Here, in the plasma etching, a gas of fluorine system such as $SF_6$, $CF_4$, $CHF_3$ and the like is high frequency discharged, and etching is performed by using radicals of these gases. In this case, pressure of the gas, flow rate, discharge power and the like are optimized to obtain desired preferable profile of each contact through hole (see FIG. 5D).

Next, on the portion of the drain electrode 29 which is exposed via the over coat film 32 and the contact through hole 34, a transparent conductive film made of an ITO film and having a film thickness of approximately 40-120 nm is formed by using sputtering mentioned later. The transparent conductive film is patterned by a photolithography process to form pixel electrodes 33. In this case, the transparent conductive film is also formed on the H side terminals 21 and the V side terminals (not shown in the drawing), and patterned simultaneously with the pixel electrodes 33 to form connecting electrodes 41 coupled to the H side terminals 21 which are terminals for the signal lines and connecting electrodes (not shown in the drawing) coupled to the V side terminals which are terminals for the scanning lines (see FIG. 6E).

On the TFT substrate 10, an alignment film 35 is formed which is made of alignment material of polyimide system and which has a film thickness of 30-60 nm, and aligning treatment is performed. Thereafter, a sealing material 20 made of adhesive of epoxy resin system is applied along the periphery of the TFT substrate 10 (see FIG. 6F).

Similarly to the TFT substrate 10, in order to fabricate an opposing substrate 17, first, a glass substrate which has a thickness of approximately 0.7 mm and which is made of alkalifree glass is prepared. On the glass substrate, a transparent conductive film is formed which is made of an ITO film having a film thickness of approximately 80-150 nm and which has a sheet resistance value of 20-40Ω/□, thereby a transparent common electrode 36 on the opposing substrate side is formed. Further, on the transparent common electrode 36, an alignment film 37 is formed which is made of alignment material of polyimide system and which has a film thickness of 30-60 nm, and aligning treatment is performed. Thereby, the opposing substrate 17 is fabricated.

Then, the TFT substrate 10 and the opposing substrate 17 are opposed and fixed via the sealing material 20 and spacers (not shown in the drawing) therebetween. A liquid crystal material L comprising a compound of fluorine system is infused from an infusing inlet 23 into the gap between the TFT substrate 10 and the opposing substrate 17. Thereafter, the infusing inlet 23 is sealed by using a sealing material 24 which is made of UV curable type resin of acrylate system. Thereby, a liquid crystal display panel having a predetermined gap between the TFT substrate 10 and the opposing substrate 17 is obtained.

Finally, on the outside surfaces of the TFT substrate 10 and the opposing substrate 17, that is, on the lower surface of the TFT substrate 10 and the upper surface of the opposing substrate 17, there are formed a TFT side polarizer film 39 comprising a polarizer film of iodine system and an opposing substrate side polarizer film 40 comprising a polarizer film of iodine system, respectively. Thereby, a liquid crystal display panel 16 is fabricated which uses the TFT substrate 10 (see FIG. 6G).

Figure 7A:
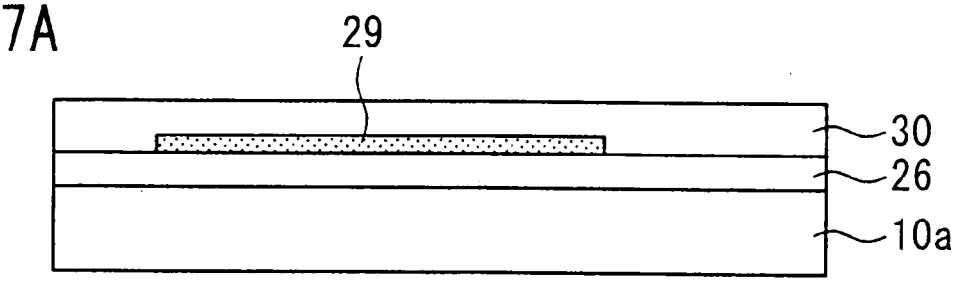
FIGS. 7A-7C are cross sectional views each illustrating structures of workpieces during a fabrication process of a contact hole of a pixel portion shown in FIG. 4.
Figure 7B:
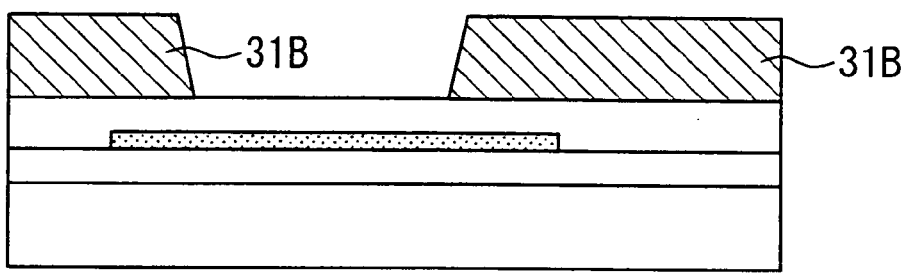
Figure 7C:
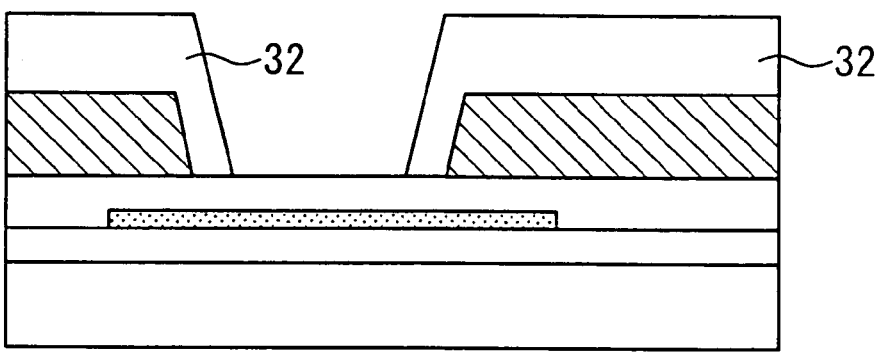
Figure 8D:
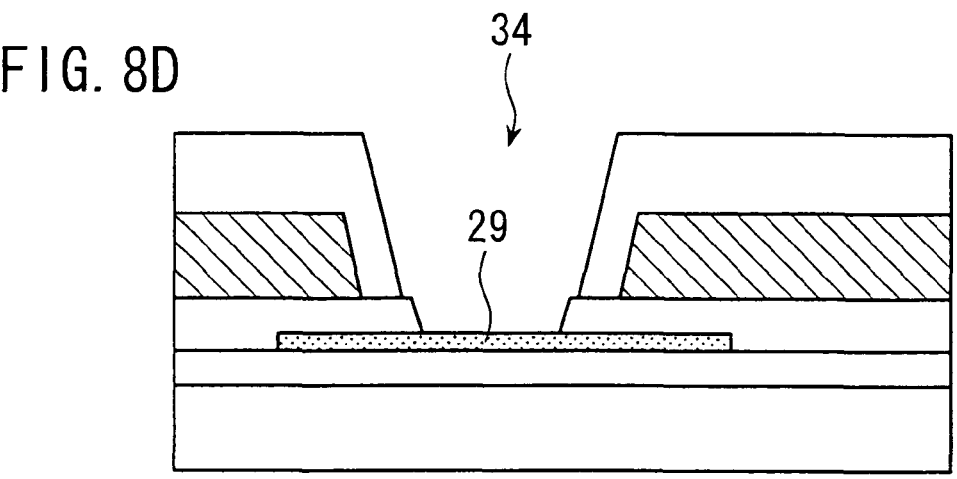
FIGS. 8D-8E are cross sectional views each illustrating structures of workpieces during a fabrication process of a contact hole of a pixel portion shown in FIG. 4 obtained after the structures shown in FIGS. 7A-7C.
Figure 8E:
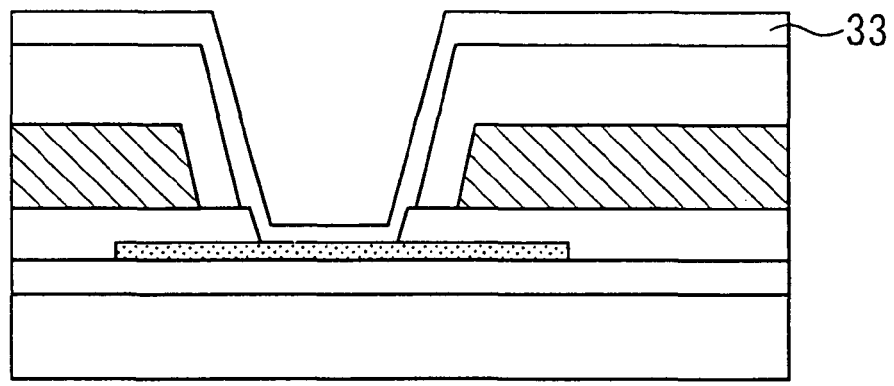

FIGS. 7A-7C and FIGS. 8D-8E are cross sectional views each illustrating structures of workpieces during a fabrication process of a contact hole of a pixel portion shown in FIG. 4. Each of FIGS. 7A-7C and FIGS. 8D-8E includes a cross sectional view taken along the line perpendicular to the line B-B of FIG. 3. FIGS. 8D-8E illustrate manufacturing steps performed after manufacturing steps illustrated by FIGS. 7A-7C.

As shown in FIGS. 7A-7C and FIGS. 8D-8E, first, a glass substrate 10*a* is prepared. On the glass substrate 10*a*, a gate insulating film 26 is formed, and a drain electrode 29 is formed thereon. Then, a passivation film 30 is formed to cover the drain electrode 29 (see FIG. 7A).

Thereafter, a color layer comprising, for example, a blue color filter 31B is formed on the passivation film 30 except the central portion thereof on the drain electrode 29 (see FIG. 7B). Further, an overcoat film 32 is formed and patterned such that the overcoat film 32 coats the color layer and has an opening at the portion where a contact through hole is to be formed (see FIG. 7C).

Thereafter, by using a photolithography process, the passivation film 30 is etched to form a contact through hole 34 through which the drain electrode 29 is exposed (see FIG. 8D).

Next, on the portion of the drain electrode 29 which is exposed via the contact through hole 34, and on the overcoat film 32, a transparent conductive film made of an ITO film is formed by using a sputtering method. The transparent conductive film is patterned by a photolithography process to form pixel electrodes 33 (see FIG. 8E). Thereby, the drain electrode 29 and the pixel electrode 33 is coupled with each other via the contact through hole 34.

Figure 9A:
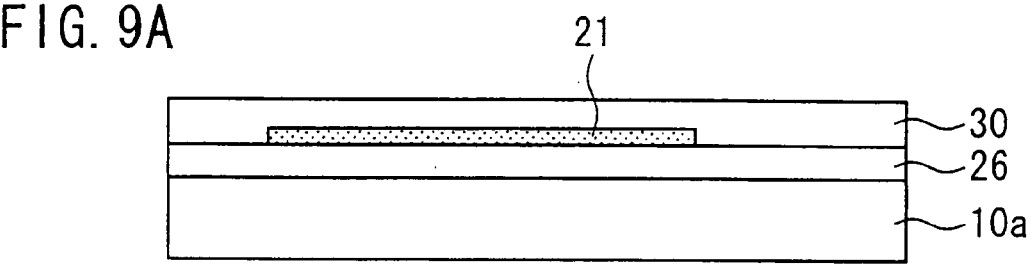
FIGS. 9A-9C are cross sectional views each illustrating structures of workpieces during a manufacturing process of a signal line terminal portion FIG. 4.
Figure 9B:
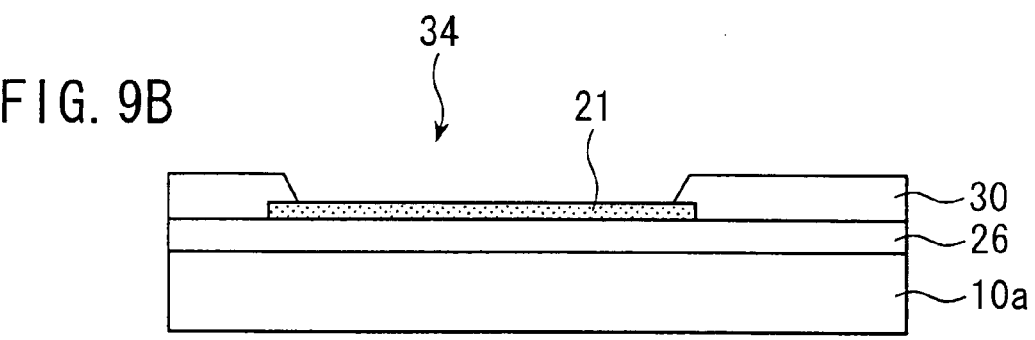
Figure 9C:
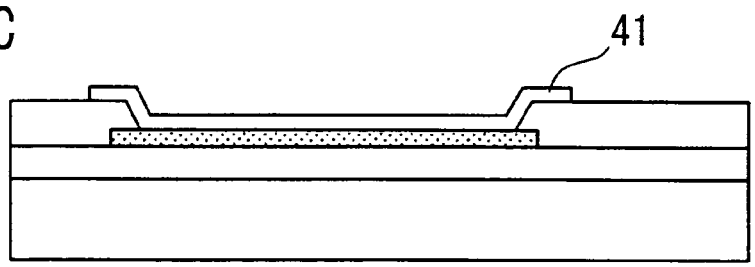

FIGS. 9A-9C are cross sectional views each illustrating structures of workpieces during a manufacturing process of a signal line terminal portion FIG. 4. Each of FIGS. 9A-9C includes a cross sectional view taken along the direction of a short side of a signal line terminal.

As shown in FIG. 9A, first, a glass substrate 10*a* is prepared. On the glass substrate 10*a*, by using a plasma CVD (chemical vapor deposition) method, a gate insulating film 26 is formed. Then, on the gate insulating film 26, an H side terminal 21 which is a signal line terminal portion is formed. Thereafter, a passivation film 30 is formed to cover the H side terminal 21 (see FIG. 9A). In a process of forming the black matrix and in a process of forming the color layer, the above-mentioned layers are not formed.

Thereafter, by using a photolithography process, the passivation film 30 is etched to form a contact through hole 34 which exposes the H side terminal 21 (see FIG. 9B).

Next, on the H side terminal 21 which is exposed via the contact through hole 34 and on the portion of the passivation film 30 at the peripheral portion of the contact through hole 34, a transparent conductive film made of an ITO film is formed by sputtering. The transparent conductive film is patterned by a photolithography process to form a connecting electrode 41 (see FIG. 9C). Thereby, the connecting electrode 41 is formed which is coupled, via the contact through hole 34, with the H side terminal 21 as the signal terminal portion. Here, formation of the transparent conductive film of the connecting electrode 41 is performed simultaneously with formation of the transparent conductive film of the pixel electrode 33.

When the transparent conductive film made of an ITO film is formed on an organic interlayer insulating film, the TFT substrate 10 is heated such that the temperature of the TFT substrate 10 becomes approximately 100-170 degrees Celsius (° C.). Also, when the transparent conductive film is formed, the film can be formed in a non-heated condition and an oxygen flow rate ratio ($O_2$/Ar) is adjusted to approximately 1% or lower, preferably to 0.5% or lower, and more preferably to 0.2% or lower. Further, after forming the film, an annealing process is performed at a temperature of 200-240 degrees Celsius.

Second Embodiment

Figure 10:
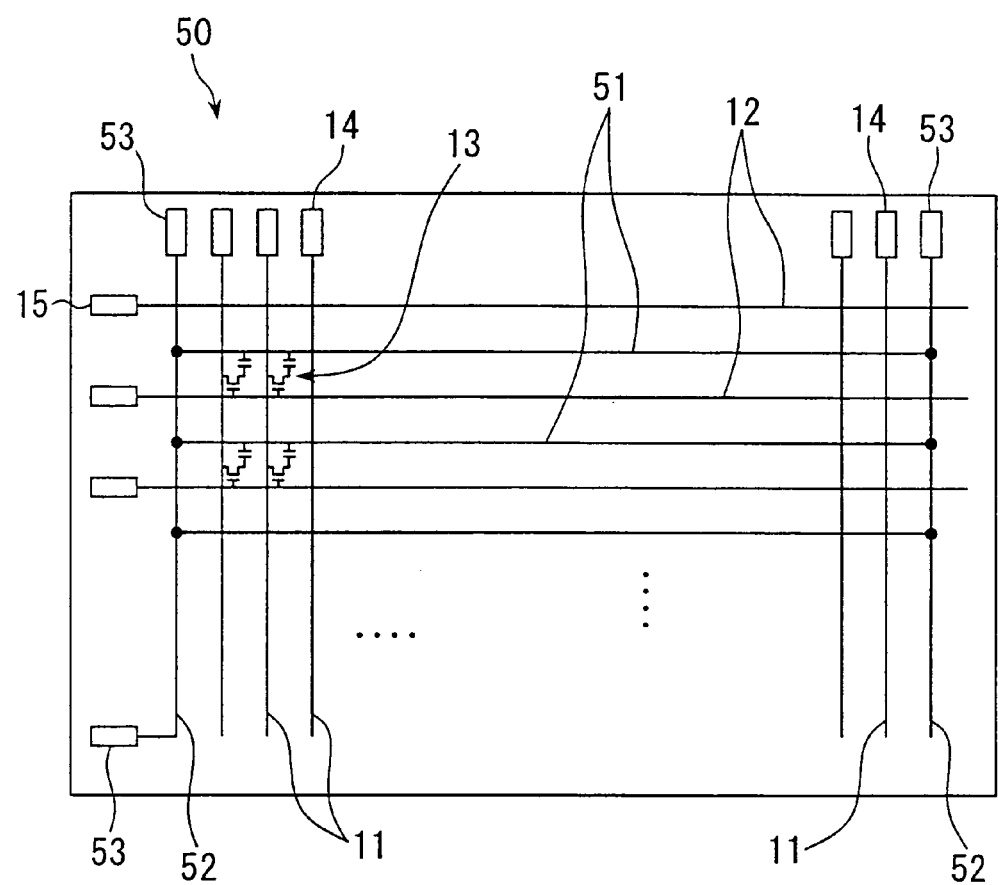
FIG. 10 is a schematic plan view illustrating a structure of a TFT substrate 50 in a transmission type liquid crystal display according to the second embodiment of the present invention.

FIG. 10 is a schematic plan view illustrating a structure of a TFT substrate 50 in a transmission type liquid crystal display according to the second embodiment of the present invention. As shown in FIG. 10, on the surface of the TFT substrate 50 on the side of an opposing substrate not shown in the drawing, there are disposed a plurality of signal lines 11 and a plurality of scanning lines 12 which intersect the signal lines 11, in a grid shaped arrangement. In the proximity of an intersection between one of the signal lines 11 and one of the scanning lines 12, a TFT 13 is formed. Therefore, the TFT's 13 are disposed in a matrix.

Also, there are disposed common wiring conductors, i.e., common lines, 51 between adjacent scanning lines 12. The common wiring conductors 51 and the pixel electrodes form storage capacitance in a common storage type liquid crystal display.

The common wiring conductors 51 are mutually coupled to apply a common voltage potential thereto. Therefore, there are disposed common coupling wire lines 52 which extend in vertical direction on both sides of the TFT substrate 50 shown in FIG. 10. That is, one of the common coupling wire lines 52 is disposed along the left side of the TFT substrate 50, and the other of the common coupling wire lines 52 is disposed along the right side of the TFT substrate 50. Both end portions of the common wiring conductors 51 are respectively coupled to the common coupling wire lines 52. The storage capacitance is formed between the common wiring conductors 51 and the pixel electrodes coupled with the drain electrodes of the TFT's 13. At one or both end portions of each of the common coupling wire lines 52, there are provided common wiring terminals 53.

Figure 11:
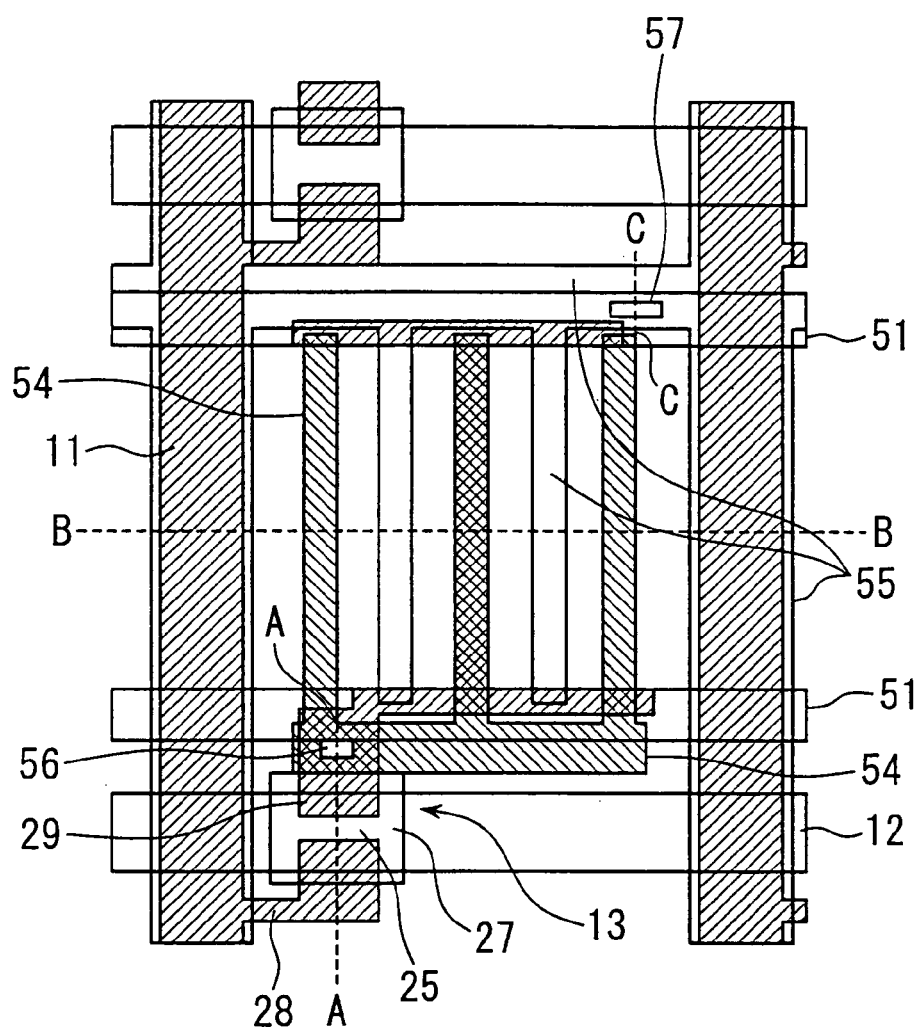
FIG. 11 is an enlarged plan view showing a portion of one pixel of the TFT substrate of FIG. 10.

FIG. 11 is an enlarged plan view showing a portion of one pixel of the TFT substrate of FIG. 10. As shown in FIG. 11, in an area on the TFT substrate 50 surrounded by the signal lines 11 and the scanning lines 12 which intersect the signal lines 11, there are disposed a comb shaped pixel electrode 54 and a comb shaped common electrode 55 which are interdigitated with each other.

The gate electrode 25 of the TFT 13 is formed by commonly using a portion of each scanning line 12. The drain electrode 29 of the TFT 13 is coupled with the pixel electrode 54 via a contact through hole 56 for pixel electrode. The common wiring conductors 51 are coupled with the common electrode 55 via a contact through hole 57 for common electrode. The source electrode 28 is coupled with the signal line 11.

In this TFT 13, a switching signal is supplied to the gate electrode 25 via the scanning line 12, and an image signal is supplied to the source electrode 28 via the signal line 11, thereby electric charges are injected or written to the pixel electrode 54.

Figure 13E:
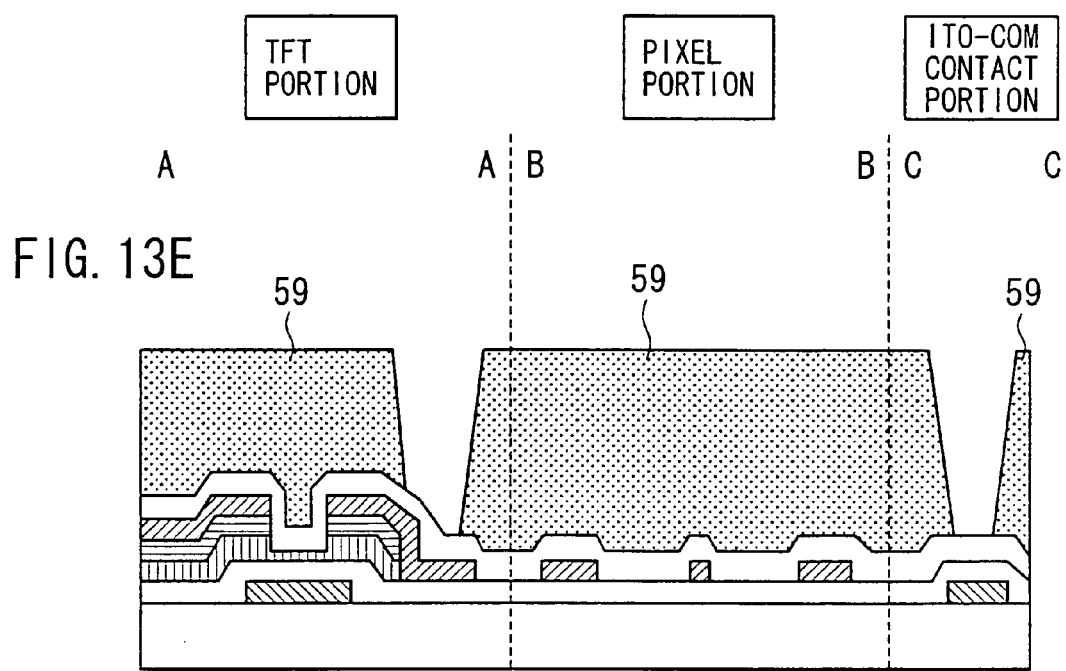
FIGS. 13E-13F are cross sectional views each illustrating structures of workpieces during a manufacturing process of a TFT substrate of FIG. 10 obtained after the structures shown in FIGS. 12A-12D.
Figure 13F:
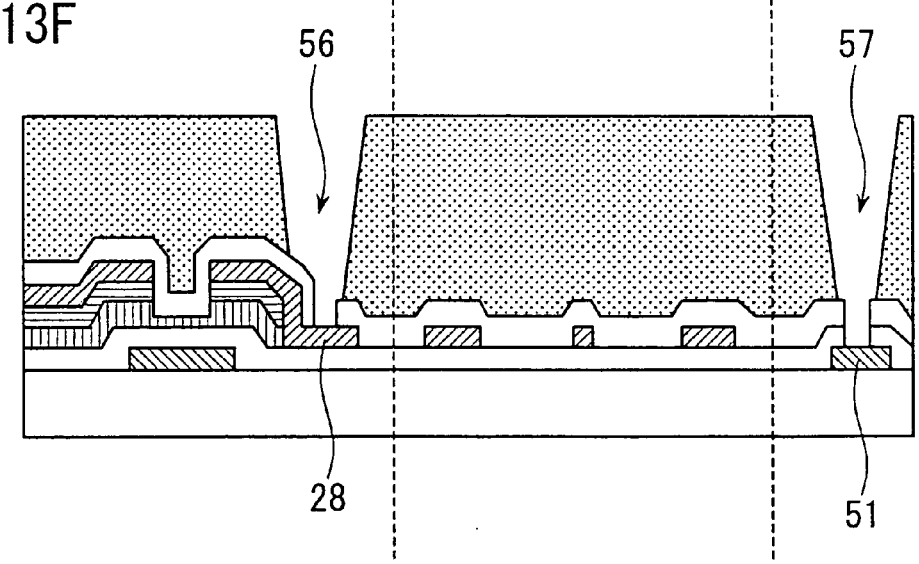
Figure 14:
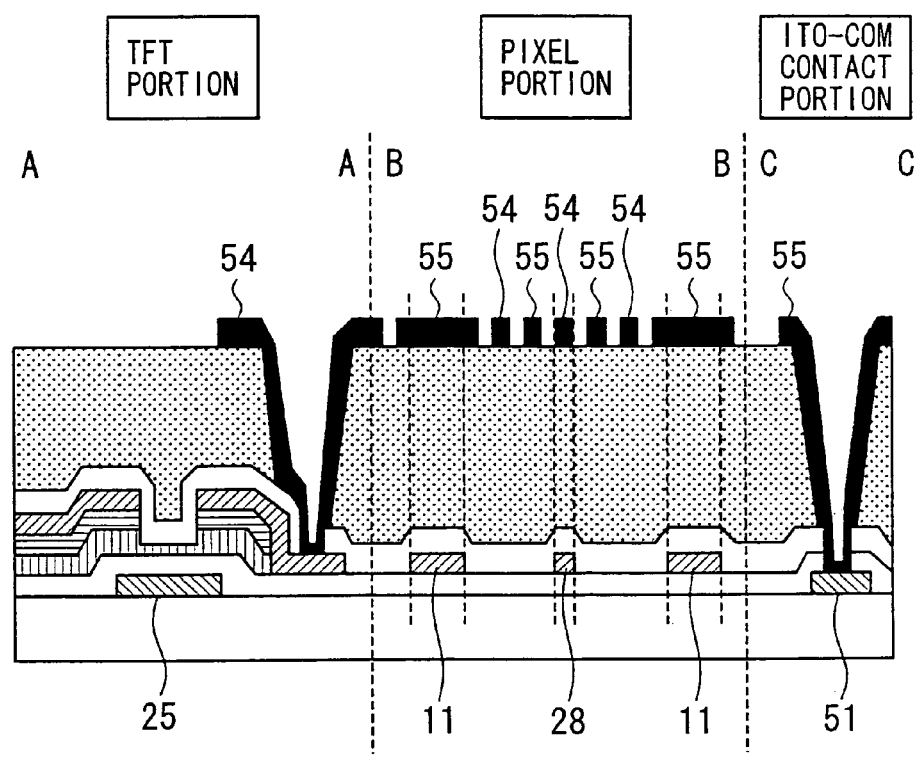
FIG. 14 is a cross sectional view illustrating a structure of a workpiece during a manufacturing process of a TFT substrate of FIG. 10 obtained after the structures shown in FIGS. 13E-13F.

FIGS. 12A-12D, FIGS. 13E-13F and FIG. 14 are cross sectional views each illustrating structures of workpieces during a manufacturing process of a TFT substrate of FIG. 10. Each of FIGS. 12A-12D, FIGS. 13E-13F and FIG. 14 includes a cross sectional view taken along the line A-A of FIG. 11, a cross sectional view taken along the line B-B of FIG. 11, and a cross sectional view taken along the line C-C of FIG. 11. In these drawings, the cross sectional view taken along the line A-A shows a TFT portion, the cross sectional view taken along the line B-B shows a pixel portion, and the cross sectional view taken along the line C-C shows a contact through hole portion for common electrode (ITO-COM portion). FIGS. 13E-13F illustrate manufacturing steps performed after manufacturing steps illustrated by FIGS. 12A-12D. Also, FIG. 14 illustrates manufacturing steps performed after manufacturing steps illustrated by FIGS. 13E-13F.

As shown in FIGS. 12A-12D, FIGS. 13E-13F and FIG. 14, first, a glass substrate 10a is prepared. On the glass substrate 10a, a conductive film made of Cr, Mo, Cr/Al stacked film, Mo/Al stacked film and the like is formed to a film thickness of approximately 100-300 nm by sputtering. By using a photolithography process, the conductive film is patterned to form gate electrodes 25, scanning lines (not shown in the drawing), the common wiring conductors 51, and scanning line terminals (not shown in the drawing) (see FIG. 12A).

Thereafter, by using a plasma CVD (chemical vapor deposition) process, a gate insulating film 26 made of silicon nitride (SiNx) is formed to a film thickness of approximately 300-500 nm. Further, a layer of amorphous silicon (a-Si) is formed to a film thickness of approximately 150-300 nm, and then a layer of phosphorus doped amorphous silicon ($n^+$ a-Si) is formed to a film thickness of approximately 30-50 nm. By using a photolithography process, these layers are patterned to form a semiconductor layer 27 (see FIG. 12B).

A conductive film made of Cr, Mo, Cr/Al/Cr stacked film, Mo/Al/Mo stacked film and the like is formed to a film thickness of approximately 100-400 nm by sputtering. By using a photolithography process, the conductive film is patterned to form source electrodes 28, drain electrodes 29, pixel electrodes of signal line layer 58, signal lines 11 which are adjacent to each other via the pixel electrode 58 therebetween, and signal line terminals (not shown in the drawing) (see FIG. 12C).

By using a plasma CVD process, a passivation film 30 is formed which is made of an inorganic film such as a silicon nitride (SiNx) film and the like to a film thickness of approximately 100-300 nm (see FIG. 12D).

Then, by using positive type novolac photoresist, an organic insulating film 59 having a film thickness of approximately 2.0-3.5 μm is formed and patterned such that an opening is formed in each portion where a contact through hole is to be formed (see FIG. 13E).

Thereafter, plasma etching is performed by using a photolithography process, and the passivation film 30 is dry etched to form a contact through hole for pixel electrode 56 which exposes the drain electrode 29, and a contact through hole which exposes a signal line terminal portion (not shown in the drawing). Also, the passivation film 30 and the gate insulating film 26 are etched to form a contact through hole for common wiring conductors 57 which exposes the common wiring conductor 51, and a contact through hole which exposes a signal line terminal portion (not shown in the drawing). Here, plasma etching is performed in a manner similar to that of the first embodiment (see FIG. 13F).

Next, on the contact through holes 56 and 57, and on the organic insulating film 59, a transparent conductive film made of an ITO film is formed by sputtering. The transparent conductive film is patterned by a photolithography process to form a pixel electrode 54, a common electrode 55, and connecting electrodes (not shown in the drawing) on the signal line terminal and the scanning line terminal. In this case, the pixel electrode 54 is located on the organic insulating film 59 corresponding to the location of the pixel electrode of the signal line layer 58. Also, the common electrode 55 is located on the organic insulating film 59 corresponding to the location of the signal line 11 (see FIG. 14).

Thereby, a structure is obtained in which the pixel electrode 54 is coupled with the source electrode 28 via the contact through hole for pixel electrode 56, the common electrode 55 is coupled with the common wiring conductors 51 via the contact through hole for common electrode 57, and the connecting electrodes are coupled with the signal line terminal and the scanning line terminal via the contact through hole for signal line and the contact through hole for scanning line, respectively.

When the transparent conductive film made of an ITO film is formed on an organic interlayer insulating film, the TFT substrate 50 is heated such that the temperature of the TFT substrate 50 becomes approximately 100-170 degrees Celsius, in a manner similar to the first embodiment. In other way, when the transparent conductive film is formed, the film is formed in a non-heated condition, i.e., at room temperature, and an oxygen flow rate ratio ($O_2$/Ar) is adjusted to approximately 1% or lower, preferably to 0.5% or lower, and more preferably to 0.2% or lower. Further, after forming the film, an annealing process is performed at a temperature of 200-240 degrees Celsius.

Thereafter, similarly to the first embodiment, an alignment film 35 is formed on the surface of the TFT substrate 50, and aligning treatment is performed. Also, an opposing substrate 17 is prepared on which a black matrix 18, color filters 31 and an alignment film 37 is formed and in which aligning treatment is performed. Then, the TFT substrate 50 and the opposing substrate 17 are opposed and fixed via the sealing material 20 and spacers 36 therebetween. A liquid crystal material L is infused from an infusing inlet into the gap between the TFT substrate 50 and the opposing substrate 17. Thereafter, the infusing inlet is sealed by using a sealing material. Thereby, a liquid crystal display panel having a wide viewing angle and a high aperture ratio is obtained.

As mentioned above, in the first embodiment and the second embodiment, it is important that, when the transparent conductive film made of an ITO film is formed on an organic interlayer insulating film, the TFT substrate is heated such that the temperature of the TFT substrate becomes approximately 100-170 degrees Celsius. As another way, when the transparent conductive film is formed, the film is formed in a non-heated condition and an oxygen flow rate ratio ($O_2$/Ar) is adjusted to approximately 1% or lower, preferably to 0.5% or lower, and more preferably to 0.2% or lower. Further, after sputtering the film, an annealing process is performed at a temperature of 200-240 degrees Celsius.

The above conditions were obtained based on the following consideration on the relationship between substrate temperature and a rate of occurrence of vertical striped unevenness, the relationship between an oxygen flow rate ratio ($O_2$/Ar) and layer resistance, and the relationship of etching residue and coloring of an organic insulating film, and the like, when the transparent conductive film was sputtered.

Figure 15:
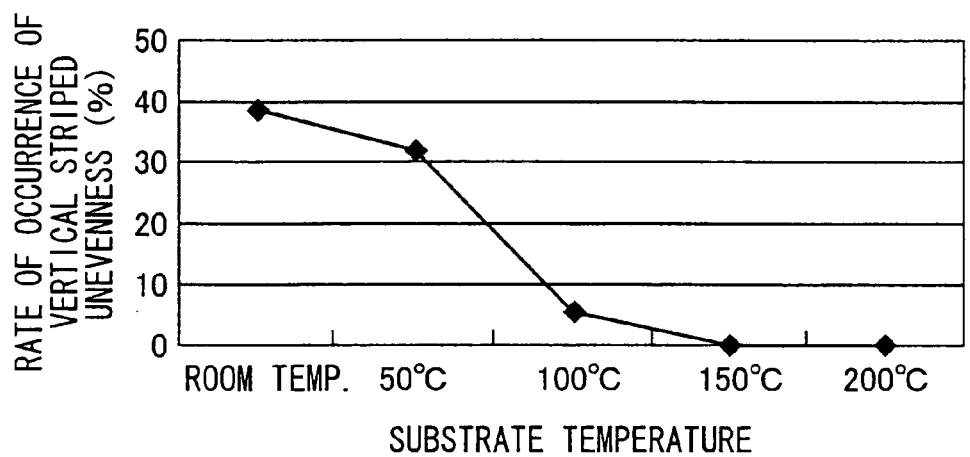
FIG. 15 is a graph showing an example of a relationship between a substrate temperature and a rate of occurrence of vertical striped unevenness, when the ITO film was formed by sputtering in accordance with the first embodiment.

FIG. 15 is a graph showing an example of a relationship between a substrate temperature and a rate of occurrence of vertical striped unevenness, when the ITO film was formed by sputtering in accordance with the first embodiment. As shown in FIG. 15, when the ITO film is sputtered while heating the TFT substrate 10, and when the substrate temperature is raised from a room temperature to 50° C., 100° C., 150° C. and further to 200° C., the rate of occurrence of vertical striped unevenness gradually becomes small. The rate of occurrence of vertical striped unevenness was approximately 40% at the room temperature, but the rate of occurrence of vertical striped unevenness became approximately 5% at 100° C., and became approximately zero at 150° C.

In this case, it is preferable that the heating of the substrate was done previously in a heating chamber which is separate from a chamber for forming the film such that the organic insulating film is sufficiently outgassed. Also, in this case, in order to keep the temperature of the substrate, heating of the substrate in the chamber for forming the film may be or may not be done.

Figure 16:
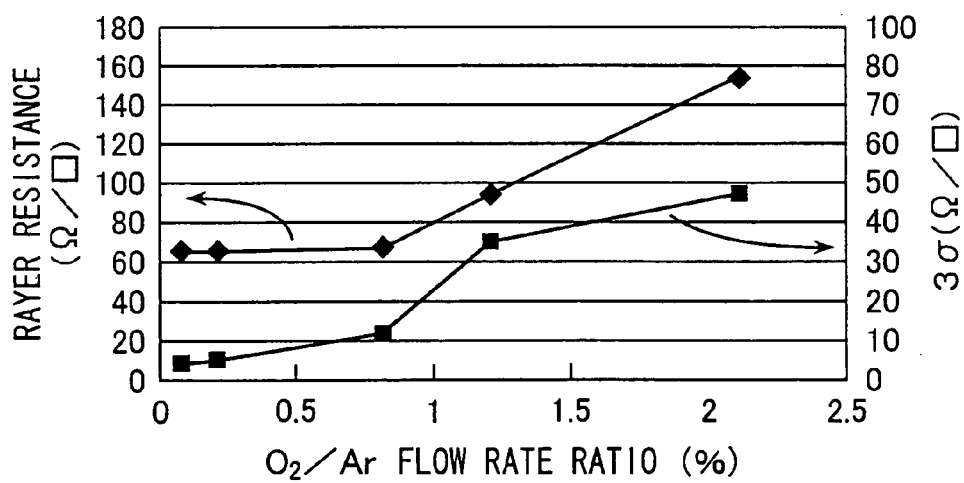
FIG. 16 is a graph showing an example of a relationship between a oxygen flow rate ratio and a layer resistance, when the ITO film is formed by sputtering in a non-heated condition.

FIG. 16 is a graph showing an example of a relationship between a oxygen flow rate ratio and a layer resistance, when the ITO film is formed by sputtering in a non-heated condition, i.e., at room temperature. As shown in FIG. 16, when the ITO film is sputtered, and when an oxygen flow rate ratio ($O_2$/Ar) is raised from approximately 0% to 2.5%, the layer resistance value gradually increases. The layer resistance value became approximately 65Ω/□ at 0.5%, approximately 80Ω/□ at 1%, and approximately 110Ω/□ at 1.5%. At the same time, dispersion 3 σ of the layer resistance value also gradually increased, and became approximately 8Ω/□ at 0.5%, approximately 23Ω/□ at 1%, and approximately 39Ω/□ at 1.5%.

Figure 17A:
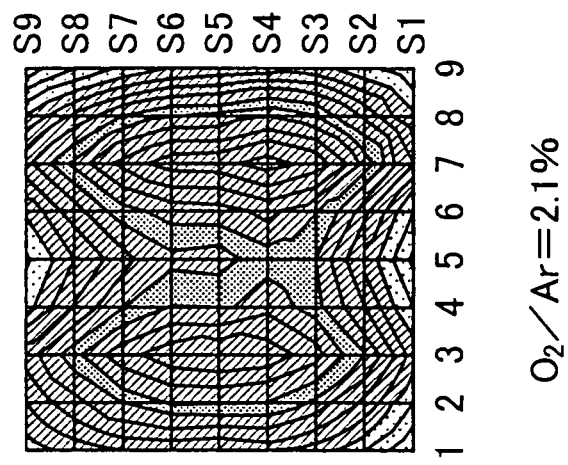
FIGS. 17A-17C are illustrations each showing an example of distribution of layer resistance within a substrate, after annealing at 200° C. after the sputtering of the ITO film in the non-heated condition.
Figure 17B:
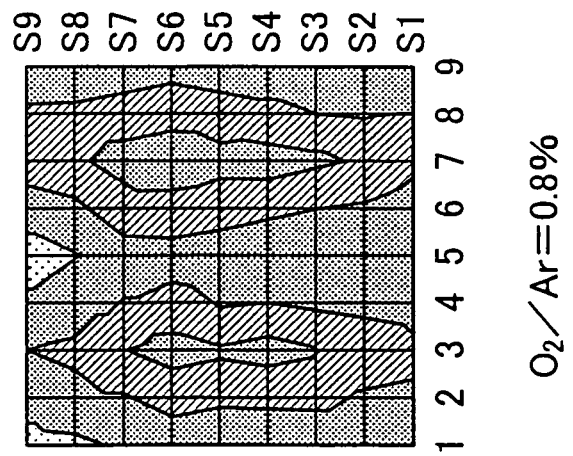
Figure 17C:
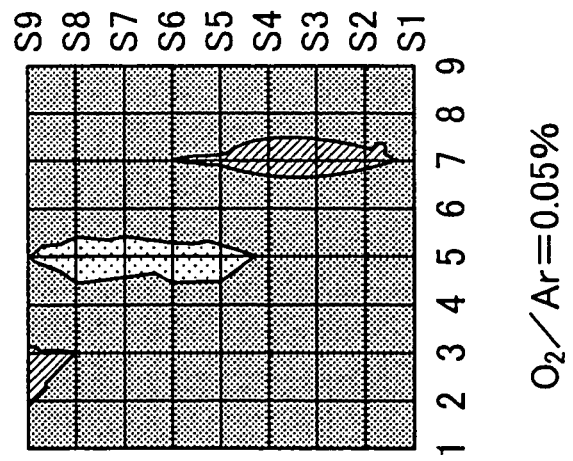
Figure 22A:
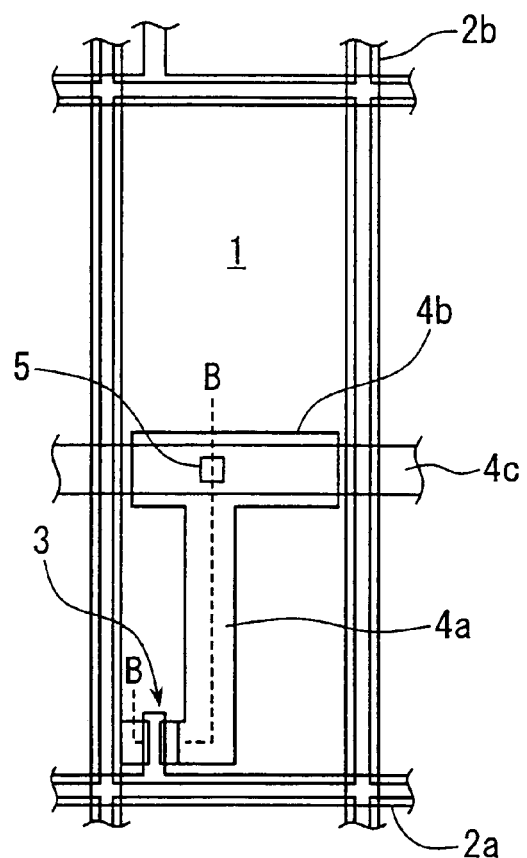
FIG. 22A is a partial enlarged plan view showing a pixel portion of an active matrix substrate in a conventional transmission type liquid crystal display which uses TFT's and which is disclosed in Japanese patent laid-open publication No. 9-152625.
Figure 22B:
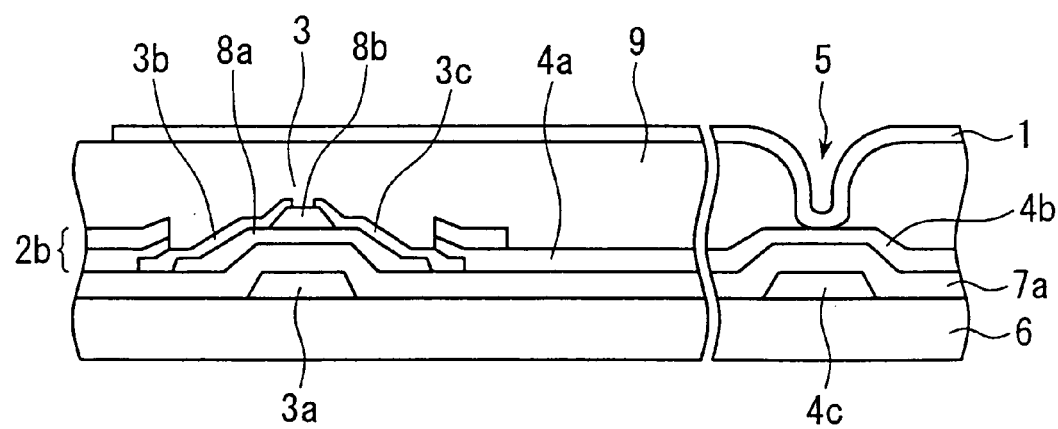
FIG. 22B is a cross sectional view taken along the line B-B of FIG. 22A.

FIGS. 17A-17C are illustrations each showing an example of distribution of layer resistance within a substrate, after annealing at 200° C. after the sputtering of the ITO film in the non-heated condition. As shown in FIGS. 17A-17C, when the oxygen flow rate ratio ($O_2$/Ar) at the sputtering of the ITO film is raised from 0.05% to 0.8% and to 2.1%, the condition of distribution of the layer resistance within the substrate becomes worse in accordance with the increase in the layer resistance.

FIG. 18 is an illustration showing by a table a relationship between the substrate temperature when the ITO film is sputtered and the condition of etching residue. Here, the etching of the ITO film was performed by using etchant of ferric chloride system and of aqua regia system. As shown in FIG. 18, when the substrate temperature was 100° C., 150° C. and 170° C., the condition of etching residue was quite satisfactory or satisfactory. However, when the substrate temperature was 200° C., quantity of etching residue of ITO became large and it was impossible to perform etching of the ITO film.

This is because the ITO film is deteriorated or changes in quality due to outgassing from the organic insulating film. Therefore, it is preferable that the substrate temperature when the ITO film is sputtered should be lower than or equal to 170° C.

FIG. 19 is an illustration showing by a table a relationship between annealing temperature and ITO line width uniformity within the substrate and between annealing temperature and coloring of the organic insulating film, after the sputtering of the ITO film in the non-heated condition. As shown in FIG. 19, with respect to the ITO line width uniformity, when the annealing temperature is 150° C. in the second embodiment, display condition became defective. With respect to the coloring of the organic insulating film, when the annealing temperature is 240° C., it is permissible, but when the annealing temperature is 250° C., transmittance is considerably deteriorated.

This is because the photoresist material of the organic insulating film is decomposed at a temperature of 240° C. or higher. Therefore, it is preferable that the annealing temperature after the ITO sputtering is in a range from 200° C. to 240° C., and it is more preferable that the annealing temperature is in a range from 200° C. to 230° C.

FIG. 20 is an illustration showing by a table a relationship between a difference in contact resistance values at portions of upside and downside signal terminals (FIG. 1) and a condition of occurrence of vertical striped unevenness, in the first embodiment. As shown in FIG. 20, when the difference in contact resistance values between the upside and downside signal terminal portions is 0Ω or 1000Ω, vertical striped unevenness is not observed. However, when the difference in contact resistance values between the upside and downside signal terminals is 1500Ω, vertical striped unevenness is slightly observed, and when the difference in contact resistance values between the upside and downside signal terminals is 3000Ω, vertical striped unevenness is clearly observed. Therefore, it is preferable that the difference in contact resistance values between the upside and downside signal terminals is 1500Ω or smaller, and it is more preferable that the difference is 1000Ω or smaller.

Also, in the liquid crystal display which is fabricated by the manufacturing method mentioned above and in which pixel electrodes are formed on the organic interlayer insulating film, it is preferable that the transparent conductive film has crystallinity at each coupling portion between the transparent conductive film and the lower layer metal film. The reason for this is as follows. That is, when it is possible to decide that a portion of the transparent conductive film contacting the lower layer metal film has crystallinity from the result of observation by using transmission electron microscope (TEM), it is deemed that defects such as the vertical striped unevenness are not observed.

FIG. 21A and FIG. 21B are schematic illustrations showing examples of observation result by the TEM of the coupling portion between the transparent conductive film and the lower layer metal film in the liquid crystal display fabricated by the manufacturing method according to the present invention.

As shown in FIG. 21A, when crystallinity is observed at the coupling portion between the transparent conductive film and the lower layer metal film, that is, when atomic disposition reaches the interface portion, lattice of ITO connects to Cr portion and vertical striped unevenness does not occur. On the other hand, as shown in FIG. 21B, when crystallinity is hardly observed at the coupling portion between the transparent conductive film and the lower layer metal film, lattice of ITO does not connect to Cr portion and vertical striped unevenness occurs. In this way, it is possible to judge whether the liquid crystal display is a good product or a defective product, based on the detailed structure at the ITO/Cr interface portion.

Therefore, it is preferable that the liquid crystal display having pixel electrodes which are formed on the organic interlayer insulating film and which are separated from the scanning lines and the signal lines is fabricated on at least one of the following various conditions.

1. Sputtering of the transparent conductive film is performed at the substrate temperature of 100-170° C.

2. Before performing the sputtering of the transparent conductive film, the substrate is heated in the same vacuum condition and thereafter sputter etching is performed. That is, the substrate is heated and outgassed previously in a heating chamber, before transporting the substrate into a chamber for forming a film. Further, by sputter etching, oxides and fluorides on the surface of the lower layer metal film at each contact through hole portion are removed.

3. The sputtering of the transparent conductive film is performed in a non-heated condition, and an oxygen flow rate ratio is set to 1% or lower. Further, annealing is performed after the sputtering. In this case, annealing is performed at a temperature in a range of 200-240° C.

These conditions are especially effective when the transparent conductive film is the ITO film, and when the lower layer metal is made of Cr or an alloy containing Cr as the main constituent.

Etching of the contact through hole formed in the passivation film or the gate insulating film is usually performed by using a gas of $CF_4$, $SF_6$ and the like. In case the lower layer metal is made of Cr or an alloy containing Cr as the main constituent, when over-etching is performed, Cr or an alloy containing Cr as the main constituent is not etched and fluorine (F) elements remain on the surface of the metal layer, thereby the contact resistance between the transparent conductive film and the lower layer metal becomes large.

It is preferable that the above-mentioned etching of the contact through hole is performed by plasma etching which uses radicals having a low energy. The reactive ion etching which is usually used for etching contact through holes and which uses ions has a high etching energy and, as a result of an analysis of the ITO/Cr interface, it was found that a large amount of fluorine (F) elements remain on the surface of the Cr film.

As mentioned above, by the experiment performed by the inventors of the present invention, it has been confirmed that the above-mentioned conditions according to the present invention are quite effective as a way of suppressing an increase in the contact resistance value.

In this way, according to the present invention, in a high resolution liquid crystal display panel which has an organic interlayer insulating film structure or in a liquid crystal display panel which has a common storage structure and the like, the conditions of forming an ITO film which constitutes pixel electrodes, for example, a heating temperature, a oxygen flow rate ratio and the like are optimized.

That is, after previously performing outgassing of a substrate by heating the substrate in a heating chamber, the substrate is transported into a chamber for forming a film and the substrate temperature at the ITO sputtering is controlled to become 100-170° C. Also, the sputtering is done in a non-heated condition such as room temperature, and an oxygen flow rate ratio is set to 1% or lower. Further, annealing is performed after the sputtering. In this case, annealing is performed at a temperature in a range of 200-240° C. Thereby, it is possible to obtain a structure in which whole portion of the ITO film on the lower layer metal at the contact through hole portion has crystallinity.

Thereby, influence of outgassing from the organic interlayer insulating film can be obviated, and film quality of an ITO film is improved such that it has crystallinity. Also, contact resistance between the ITO film and the lower layer metal can be decreased and uniformed, without causing an increase in a contact resistance value and unevenness thereof within a substrate surface.

As a result, it is possible to suppress vertical striped unevenness in a high resolution liquid crystal display panel. It is also possible to decrease lateral cross talk in a TN or IPS type liquid crystal display panel having a common storage structure.

In the above-mentioned embodiments, as an example, an organic insulating film such as a photosensitive novolac type photoresist film is used as an insulating film formed by coating. However, the present invention is not limited to such film. It is of course possible to use polyimide resin, acrylic resin and the like, and also to use inorganic resin material such as silicon oxide, silicon nitride and the like. Also, it is possible to use materials which are not photosensitive. In such case, it is necessary to perform an etching process and a resist removing process after development, in a manner similar to a usual photolithography process.

Also, in the above-mentioned embodiments, a process of forming an insulating film which is applied by coating and a process of forming an opening in a passivation film use separate photolithography processes. However, it is also possible to use the same process to form such opening.

Further, in the above-mentioned embodiments, a liquid crystal display is described which uses inverted staggered channel etching type TFT's. However, it is also possible to use TFT's of channel protection type or non-inverted staggered type TFT's. Further, it is also possible to apply the present invention not only to TFT of staggered type but also to coplanar type TFT's. Also, the present invention can be applied not only to amorphous silicon (a-Si) TFT's but also to polysilicon (p-Si) TFT's. Still further, each of the switching elements may be an MIM (metal-insulator-metal) type element.

As mentioned above, according to the present invention, there is provided a liquid crystal display which has bus wires disposed in a matrix or in the shape of a grid, switching elements coupled to the bus wires, and pixel electrodes which are disposed on an interlayer insulating film formed by coating and which are coupled with the switching elements via contact through holes formed via the interlayer insulating film. In the process of fabricating the liquid crystal display, when a transparent conductive film is formed on the interlayer insulating film which is formed by coating, the temperature of the substrate is controlled to become 100° C.-170° C. In other way, when the transparent conductive film is formed on the interlayer insulating film in a non-heated condition, an oxygen flow rate ratio is set to 1% or lower, and annealing is performed after forming the film.

Thereby, the ITO film on the lower layer metal at the contact through hole portion has crystallinity. Also, when etching the ITO film on the interlayer insulating film, etching residue is not produced. Further, contact resistance between the ITO film and the lower layer metal can be uniformly decreased, and display defects on the display screen of the liquid crystal display can be obviated.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are to be included within the scope of the present invention. Therefore, it is intended that this invention encompasses all of the variations and modifications as falling within the scope of the appended claims.

What is claimed is:

1. A liquid crystal display comprising:
a transparent substrate;
a plurality of parallel scanning lines disposed on the transparent substrate;
a plurality of parallel signal lines which cross the plurality of parallel scanning lines;
switching elements coupled to the scanning lines and the signal lines;
pixel electrodes formed from a transparent conductive film disposed on an interlayer insulating film formed by coating, the pixel electrodes being coupled with the switching elements via contact through holes formed through the interlayer insulating film; and
signal line terminals each of which is coupled to one end of the respective signal lines and comprises a stacked portion of the transparent conductive film and a lower layer metal film and which are disposed on opposite sides of the substrate alternately;
wherein the transparent conductive film in each of signal line terminals disposed on opposite sides of the substrate has crystallinity at a coupling portion between the transparent conductive film and the lower layer metal film, and
contact resistance between the transparent conductive film and the lower layer metal film differs between the signal line terminals on opposite sides of the substrate by a value of 1500Ω or smaller.

2. A liquid crystal display as set forth in claim 1, wherein the interlayer insulating film formed by coating is an organic insulating film.

3. A liquid crystal display as set forth in claim 1, wherein the transparent conductive film is made of ITO, and the lower layer metal film coupled with the transparent conductive film is made of chromium or an alloy containing chromium as the main constituent.

* * * * *